United States Patent
Drevon et al.

(10) Patent No.: US 11,985,585 B2
(45) Date of Patent: May 14, 2024

(54) DOWNLINK SIGNALING TO USER EQUIPMENT IN NON-3GPP IDLE STATE

(71) Applicant: Nokia Technologies Oy, Espoo (FI)

(72) Inventors: Nicolas Drevon, Paris (FR); Laurent Thiebaut, Antony (FR)

(73) Assignee: Nokia Technologies Oy, Espoo (FI)

( * ) Notice: Subject to any disclaimer, the term of this patent is extended or adjusted under 35 U.S.C. 154(b) by 553 days.

(21) Appl. No.: 17/267,078

(22) PCT Filed: Aug. 10, 2018

(86) PCT No.: PCT/EP2018/071837
§ 371 (c)(1),
(2) Date: Feb. 9, 2021

(87) PCT Pub. No.: WO2020/030292
PCT Pub. Date: Feb. 13, 2020

(65) Prior Publication Data
US 2021/0243678 A1    Aug. 5, 2021

(51) Int. Cl.
*H04W 48/08* (2009.01)
*H04W 48/02* (2009.01)
(52) U.S. Cl.
CPC ........... *H04W 48/08* (2013.01); *H04W 48/02* (2013.01)
(58) Field of Classification Search
CPC .............................. H04W 48/08; H04W 48/02
See application file for complete search history.

(56) References Cited

U.S. PATENT DOCUMENTS

| | | | |
|---|---|---|---|
| 2013/0324170 A1* | 12/2013 | Watfa | H04W 4/14 455/466 |
| 2016/0227467 A1* | 8/2016 | Tomici | H04W 48/06 |
| 2016/0295466 A1* | 10/2016 | da Silva | H04W 28/0861 |
| 2016/0295483 A1* | 10/2016 | Jung | H04W 36/22 |
| 2016/0337310 A1* | 11/2016 | Faccin | H04W 48/17 |
| 2016/0338128 A1* | 11/2016 | da Silva | H04W 76/15 |
| 2018/0192337 A1* | 7/2018 | Ryu | H04W 36/14 |
| 2018/0317157 A1* | 11/2018 | Baek | H04W 28/16 |
| 2018/0324577 A1* | 11/2018 | Faccin | H04W 36/0079 |

(Continued)

FOREIGN PATENT DOCUMENTS

| | | |
|---|---|---|
| CN | 106134281 A | 11/2016 |
| EP | 2 296 418 A1 | 3/2011 |

(Continued)

OTHER PUBLICATIONS

3GPP TS 23_502 V15_2_0 23502-f20 (Year: 2018).*

(Continued)

*Primary Examiner* — Ernest G Tacsik
(74) *Attorney, Agent, or Firm* — Joseph C. Drish; Harrington & Smith

(57) ABSTRACT

A communication system includes a service responsible for sending signaling to a user equipment or an access network serving the user equipment. The service receives a request to send the signaling to the user equipment or the access network together with access type control information indicating whether the signaling is transmittable using any of a plurality of access types or a specific access type provided in the request. The service selectively forwards the signaling to the user equipment or the access network based on the access type control information.

10 Claims, 14 Drawing Sheets

(56) References Cited

U.S. PATENT DOCUMENTS

| | | | |
|---|---|---|---|
| 2018/0367980 A1* | 12/2018 | Lee | H04L 67/51 |
| 2019/0007992 A1* | 1/2019 | Kim | H04W 76/27 |
| 2019/0028961 A1* | 1/2019 | Faccin | H04W 48/02 |
| 2019/0274178 A1* | 9/2019 | Salkintzis | H04W 76/15 |
| 2019/0394711 A1* | 12/2019 | Kim | H04W 76/25 |
| 2020/0100101 A1* | 3/2020 | Torvinen | H04W 12/03 |
| 2020/0120585 A1* | 4/2020 | Kumar | H04W 60/04 |
| 2020/0137672 A1* | 4/2020 | Rommer | H04W 8/08 |
| 2020/0213819 A1* | 7/2020 | Kim | H04W 88/18 |
| 2021/0029603 A1* | 1/2021 | Kim | H04W 60/00 |
| 2021/0160680 A1* | 5/2021 | Velev | H04W 4/50 |
| 2021/0410010 A1* | 12/2021 | Salkintzis | H04W 76/10 |

FOREIGN PATENT DOCUMENTS

| | | |
|---|---|---|
| EP | 2 439 979 A1 | 4/2012 |
| KR | 20160035049 A | 3/2016 |
| WO | WO 2018/097601 A1 | 5/2018 |

OTHER PUBLICATIONS

3GPP TSG-CT WG1 Meeting #111, Osaka (Japan), May 21-25, 2018, C1-183777, "Access type selection for the de-registration procedure", Apple Europe Limited, 7 pgs.

3GPP TSG-CT WG1 Meeting #106, Kochi (India), Oct. 23-27, 2017, C1-174180, "Correction of de-registration procedure", LG Electronics, 5 pgs.

SA WG2 Meeting #127, Apr. 16-20, 2018, Sanya, China, S2-183689, "Updating 6.2 Solution 2 to add a procedure for Multi-Access PDU Session Release", ETRI, 3 pgs.

3GPP TSG-SA2 Meeting #127, Apr. 16-20, 2018, Sanya, P.R.China, S2-184440, "Clarification of the mapping relation between PDU session ID and access type in the AMF", Huawei, Hisilicon, LG Electronics, 14 pgs.

ETSI TS 123 502 V15.2.0 (Jun. 2018), "5G; Procedures for the 5G System (3GPP TS 23.502 version 15.2.0 Release 15)", Section 4.2.2.3.3. Network-initiated Deregistration, 3 pgs.

* cited by examiner

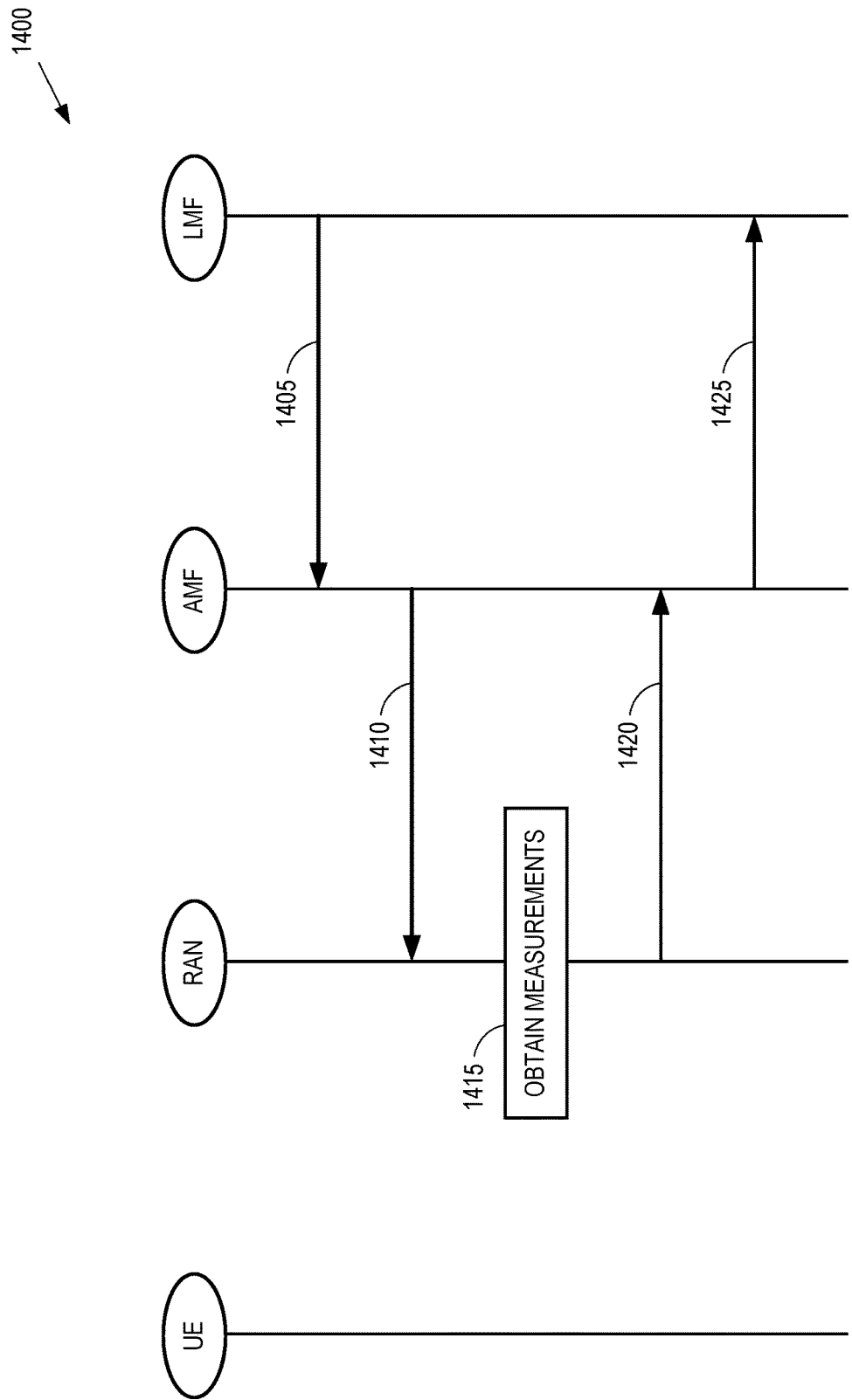

US 11,985,585 B2

DOWNLINK SIGNALING TO USER EQUIPMENT IN NON-3GPP IDLE STATE

CROSS REFERENCE TO RELATED APPLICATION

This patent application is a U.S. National Stage application of International Patent Application Number PCT/EP2018/071837 filed Aug. 10, 2018, which is hereby incorporated by reference in its entirety.

BACKGROUND

Upcoming generations of wireless communication systems, such as Fifth Generation (5G) communication systems, are expected to enable applications such as virtual reality, augmented reality, reliable remote operation of machines, factory automation, network-assisted control of traffic and self-driving vehicles, and the cellular "Internet of Things (IoT)" that supports internetworking of physical devices such as appliances, vehicles, buildings, and other items that are embedded with electronics, software, sensors, actuators, and network connectivity that enable the devices to collect and exchange data over the Internet. Future 5G communication systems will therefore be required to support gigabit per second data rates (e.g., to support virtual or augmented reality applications), end-to-end latencies of at most 10 milliseconds (ms) (e.g., to support factory automation applications), reliabilities of at least 99.999% (e.g., for automotive traffic control applications such as platooning), and user equipment densities of tens of millions of devices per square kilometer (e.g., to support cellular IoT applications). Communication systems that operate according to the 5G standards are expected to provide Third Generation Partnership Project (3GPP) radio access and non-3GPP access (wireless or fixed) access on an equal footing. User equipment will therefore be able to perform dual access by connecting to the 5G core network via concurrent 3GPP radio access and non-3GPP (wireless or fixed) access.

SUMMARY

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

Some embodiments of a method include receiving, at a service responsible for sending signaling to a user equipment or an access network serving the user equipment, a request to send the signaling to the user equipment or to the access network together with access type control information indicating whether the signaling is transmittable using any of a plurality of access types or a specific access type provided in the request. The method also includes selectively forwarding from the service the signaling to the user equipment or the access network based on the access type control information.

In some embodiments of the method, the plurality of access types includes a Third Generation Partnership Project (3GPP) access type and a non-3GPP access type.

In some embodiments of the method, the service is supported by an access and mobility management function (AMF).

In some embodiments of the method, the signaling to be sent includes at least one of non-access stratum (NAS) signaling to be sent to the user equipment and N2 signaling to be sent to the access network.

In some embodiments of the method, the service rejects the request when it is not possible to send the signaling via the specific access type provided in the request.

In some embodiments of the method, the service detects that it is not possible to send the signaling via the specific access type provided in the request when at least one of following conditions applies:

(1) the user equipment is not in a CONNECTED state via the specific access type and either the user equipment cannot be paged via the specific access type or the user equipment does not answer to paging over the specific access type, or (2) the user equipment is in the CONNECTED state via the specific access type and the access network indicates a failure of access network paging.

In some embodiments of the method, in case the access type control information provided in the request indicates that the signaling is transmittable using any of the plurality of access types, the service tries to send the signaling via a further one of the plurality of access types when it is not possible to send the signaling via a previous one of the plurality of access types.

In some embodiments of the method, in case the access type control information provided in the request indicates that the signaling is transmittable using any of the plurality of access types, the request provides an order between the access types for the service to try sending the signaling.

In some embodiments of the method, an entity generating the request is a part of a session management function (SMF).

In some embodiments of the method, the SMF determines the access type control information based on policy information.

In some embodiments of the method, the policy information is received from a policy control function (PCF) and the PCF indicates whether policy information is valid for a specific access type or for any of the plurality of access types.

Some embodiments of a method include receiving policy information indicating whether the policy information is applicable to any of a plurality of access types or a specific access type. The method also includes generating a request to send signaling to at least one of a user equipment or an access network together with access type control information indicating whether the signaling is transmittable using any of the plurality of access types or a specific access type.

In some embodiments of the method, the plurality of access types includes a Third Generation Partnership Project (3GPP) access type and a non-3GPP access type.

In some embodiments of the method, receiving the policy information and generating the request include receiving the policy information at an entity that is a part of a session management function (SMF) and generating the request at the entity.

Some embodiments of the method include determining, at the SMF, the access type control information based on the policy information.

In some embodiments of the method, receiving the policy information includes receiving the policy information from a policy control function (PCF).

In some embodiments of the method, the PCF indicates whether policy information is valid for a specific access type or any of the plurality of access types.

Some embodiments of an apparatus include at least one processor and at least one memory including computer program code. The at least one memory and the computer program code are configured to, with the at least one processor, cause the apparatus at least to perform receiving, at a service responsible for sending signaling to a user equipment or an access network serving the user equipment, a request to send the signaling to the user equipment or to the access network together with access type control information indicating whether the signaling is transmittable using any of a plurality of access types or a specific access type provided in the request. The at least one memory and the computer program code are also configured to, with the at least one processor, cause the apparatus at least to perform selectively forwarding from the service the signaling to the user equipment or the access network based on the access type control information.

In some embodiments of the apparatus, the plurality of access types includes a Third Generation Partnership Project (3GPP) access type and a non-3GPP access type.

In some embodiments of the apparatus, the service is supported by an access and mobility management function (AMF).

In some embodiments of the apparatus, the signaling to be sent includes at least one of non-access stratum (NAS) signaling to be sent to the user equipment and N2 signaling to be sent to the access network.

In some embodiments of the apparatus, the service rejects the request when it is not possible to send the signaling via the specific access type provided in the request.

In some embodiments of the apparatus, the service detects that it is not possible to send the signaling via the specific access type provided in the request when at least one of following conditions applies:
 (1) the user equipment is not in a CONNECTED state via the specific access type and either the user equipment cannot be paged via the specific access type or the user equipment does not answer to paging over the specific access type, or
 (2) the user equipment is in the CONNECTED state via the specific access type and the access network indicates a failure of access network paging.

In some embodiments of the apparatus, in case the access type control information provided in the request indicates that the signaling is transmittable using any of the plurality of access types, the service tries to send the signaling via a further one of the plurality of access types when it is not possible to send the signaling via a previous one of the plurality of access types.

In some embodiments of the apparatus, in case the access type control information provided in the request indicates that the signaling is transmittable using any of the plurality of access types, the request provides an order between the access types for the service to try sending the signaling.

In some embodiments of the apparatus, an entity generating the request is a part of a session management function (SMF).

In some embodiments of the apparatus, the SMF determines the access type control information based on policy information.

In some embodiments of the apparatus, the policy information is received from a policy control function (PCF), and wherein the PCF indicates whether policy information is valid for a specific access type or for any of the plurality of access types.

Some embodiments of an apparatus include at least one processor and at least one memory including computer program code. The at least one memory and the computer program code are configured to, with the at least one processor, cause the apparatus at least to perform receiving policy information indicating whether the policy information is applicable to any of a plurality of access types or a specific access type. The at least one memory and the computer program code are also configured to, with the at least one processor, cause the apparatus at least to perform generating a request to send signaling to at least one of a user equipment or an access network together with access type control information indicating whether the signaling is transmittable using any of the plurality of access types or a specific access type.

In some embodiments of the apparatus, the plurality of access types includes a Third Generation Partnership Project (3GPP) access type and a non-3GPP access type.

In some embodiments of the apparatus, the plurality of access types includes a Third Generation Partnership Project (3GPP) access type and a non-3GPP access type.

In some embodiments of the apparatus, receiving the policy information and generating the request comprises receiving the policy information at an entity that is a part of a session management function (SMF) and generating the request at the entity.

In some embodiments of the apparatus, the at least one memory and the computer program code are further configured to, with the at least one processor, cause the apparatus at least to perform determining, at the SMF, the access type control information based on the policy information.

In some embodiments the apparatus, receiving the policy information includes receiving the policy information from a policy control function (PCF).

In some embodiments of the apparatus, the PCF indicates whether policy information is valid for a specific access type or any of the plurality of access types.

Some embodiments of an apparatus include means for receiving, at a service responsible for sending signaling to a user equipment or an access network serving the user equipment, a request to send the signaling to the user equipment or to the access network together with access type control information indicating whether the signaling is transmittable using any of a plurality of access types or a specific access type provided in the request. The apparatus also includes means for selectively forwarding from the service the signaling to the user equipment or the access network based on the access type control information.

In some embodiments of the apparatus, the means for selectively forwarding comprises means for selectively forwarding according to at least one of a Third Generation Partnership Project (3GPP) access type and a non-3GPP access type.

In some embodiments of the apparatus, the means for selectively forwarding includes an access and mobility management function (AMF).

In some embodiments of the apparatus, the means for selectively forwarding includes means for selectively sending at least one of non-access stratum (NAS) signaling to be sent to the user equipment and N2 signaling to be sent to the access network.

Some embodiments of the apparatus include means for rejecting the request when it is not possible to send the signaling via the specific access type provided in the request.

Some embodiments of the apparatus include means for detecting that it is not possible to send the signaling via the specific access type provided in the request when at least one of following conditions applies:
(1) the user equipment is not in a CONNECTED state via the specific access type and either the user equipment cannot be paged via the specific access type or the user equipment does not answer to paging over the specific access type, or
(2) the user equipment is in the CONNECTED state via the specific access type and the access network indicates a failure of access network paging.

Some embodiments of the apparatus include, in case the access type control information provided in the request indicates that the signaling is transmittable using any of the plurality of access types, means for sending the signaling via a further one of the plurality of access types when it is not possible to send the signaling via a previous one of the plurality of access types.

Some embodiments of the apparatus include in case the access type control information provided in the request indicates that the signaling is transmittable using any of the plurality of access types, means for providing a request including an order between the access types for the service to try sending the signaling.

In some embodiments of the apparatus, means for generating the request is a part of a session management function (SMF).

In some embodiments of the apparatus, the SMF determines the access type control information based on policy information.

Some embodiments of the apparatus include means for receiving the policy information from a policy control function (PCF) and the PCF indicates whether policy information is valid for a specific access type or for any of the plurality of access types.

Some embodiments of an apparatus include means for receiving policy information indicating whether the policy information is applicable to any of a plurality of access types or a specific access type. The apparatus also includes means for generating a request to send signaling to at least one of a user equipment or an access network together with access type control information indicating whether the signaling is transmittable using any of the plurality of access types or a specific access type.

Some embodiments of the apparatus include means for transmitting access type control information indicating at least one of a Third Generation Partnership Project (3GPP) access type and a non-3GPP access type.

Some embodiments of the apparatus include means for receiving the policy information at an entity that is a part of a session management function (SMF) and generating the request at the entity.

Some embodiments of the apparatus include means for determining, at the SMF, the access type control information based on the policy information.

Some embodiments of the apparatus include means for receiving the policy information includes receiving the policy information from a policy control function (PCF).

In some embodiments of the apparatus, the PCF indicates whether policy information is valid for a specific access type or any of the plurality of access types.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 14 is a message flow for obtaining network assistance data according to some embodiments.

DETAILED DESCRIPTION

Figure 1:
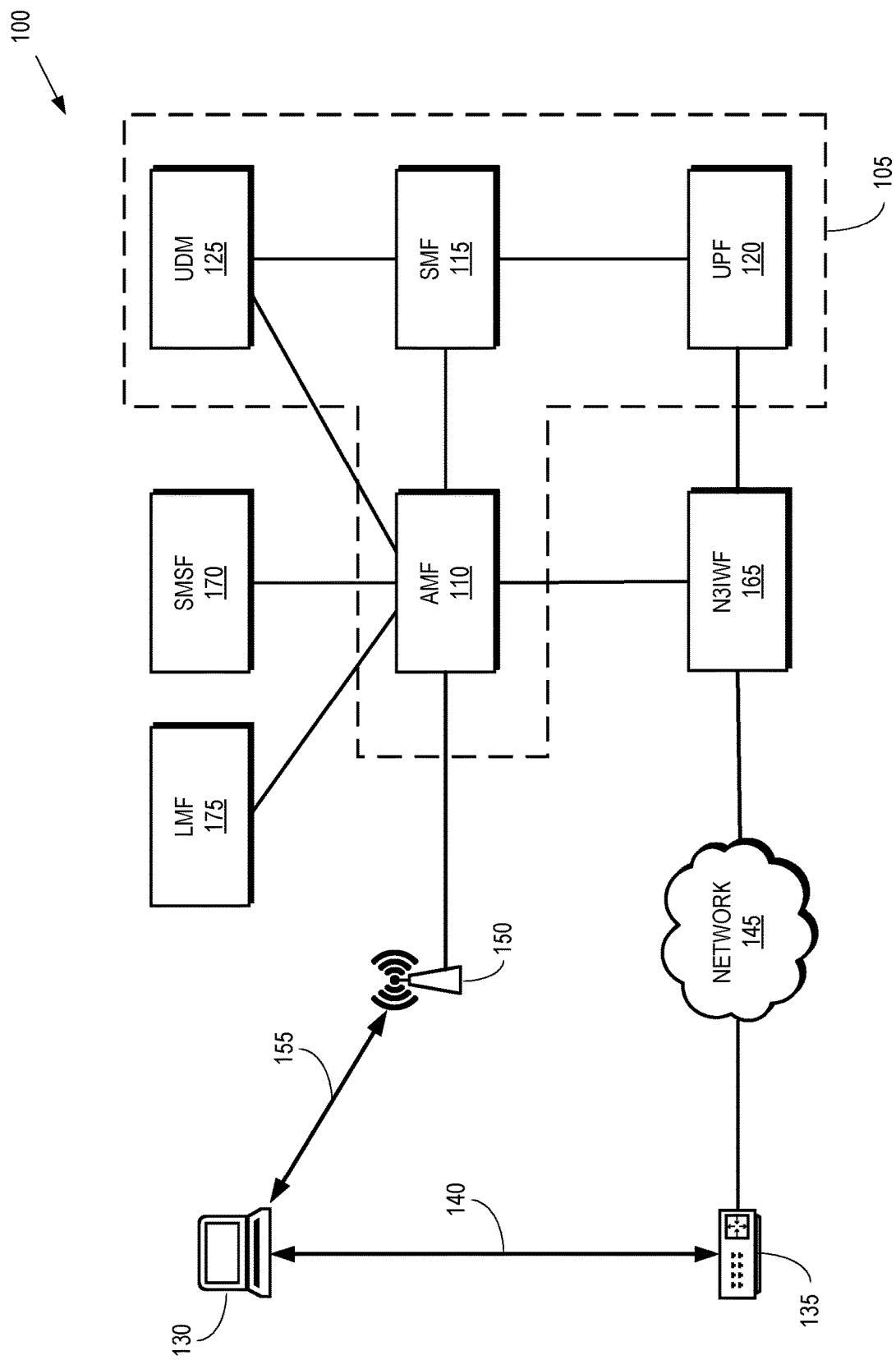
FIG. 1 is a block diagram of a communication system that supports selectively transmitting non-access stratum (NAS) containers via 3GPP access or non-3GPP access according to some embodiments.

Communication systems that operate according to Fifth Generation (5G) standards permit user equipment to maintain independent registrations to the 5G core network via Third Generation Partnership Project (3GPP) access according to 3GPP access protocols and via non-3GPP access according to non-3GPP access protocols. The user equipment can be either registered to the 5G core network via 3GPP access or registered to the 5G core network via non-3GPP access, or concurrently registered to the 5G core network via 3GPP and non-3GPP accesses. The 3GPP and non-3GPP protocols support a registration management (RM)-registered and connection management (CM)-connected state in which the user equipment has a signaling communication channel with the 5G core network, an RM-registered and CM-idle state in which the user equipment is registered with the 5G core network but does not have a signaling communication channel with the 5G core network, and a RM-de-registered state in which the user equipment is not registered with the 5G core network.

Non-access stratum (NAS) signaling between the 5G core network and the user equipment is conveyed to the user equipment in NAS containers formed by a network function (NF) such as a session management function (SMF) that manages the PDU sessions (for both the 3GPP and non-3GPP accesses), SMS function (SMSF) that manages the short message service (SMS) (for both the 3GPP and non-3GPP accesses), or a location management function (LMF) that manages user equipment (UE) positioning services. Over each of 3GPP and non-3GPP access, when the user equipment (UE) is in RM-registered and CM-Connected state, the user equipment is reachable from the 5G core network via (NAS) signaling sent over that access. However, the non-3GPP access differs from the 3GPP access because user equipment can be paged by the 5G core network via 3GPP access but cannot be paged via non 3GPP access. Furthermore, policy rules associated to a PDU session may require the SMF to form the NAS signaling sent to the UE. The rules are generated for the SMF by a policy control function (PCF) that performs policy and charging control (PCC).

Network Functions (NF) and NF services send NAS signaling to the UE or N2 UE related signaling to the 5G-AN (5G Access Network) serving the UE via a common service (supported by the AMF—Access and Mobility control Function). The N2 UE related signaling corresponds to signaling sent by the 5G core to the 5G-AN (Access Network) serving a UE on a given access. The Network Functions (NF) and NF services that send NAS signaling to the UE or N2 UE related signaling to the 5G-AN (5G Access Network) serving the UE are called consumers of the NAS and/or N2 transfer service.

Examples of consumers of the NAS and/or N2 transfer service are:
 a. (services of) the SMF for PDU Session related signaling,
 b. (services of) the SMSF for SMS transfer,
 c. (services of) the LMF for location related signaling exchange with the UE (such as "LTE Positioning Protocol (LPP) messages")
 d. (services of) the PCF for the transfer of "UE policy container"

However, different consumers of the NAS and/or N2 transfer service may have different needs with regard to which access (3GPP or Non 3GPP or any of them) may be used to transfer signaling to the UE. For example, a SMSF does not care of the access used to send a SMS to the UE; a PCF may not care of the access used to send policies to the UE; other NAS signaling, such as for location management functions, are specific to 3GPP access. Conversely, when NAS and N2 signaling is access dependent (e.g. the QoS parameters of a PDU Session depend on the access type currently serving that PDU Session) the SMF may control which access is used for NAS and N2 signaling it requests to send. Some NAS and N2 signaling related with PDU sessions is specific to an access type (e.g. non-3GPP) because the PCC rules for 3GPP access differ from the PCC rules for non-3GPP access. As opposed to that, some NAS and N2 signaling related with PDU sessions does not depend on the access type, such as signaling related to the release of a PDU Session. Furthermore, the decision of the NAS and/or N2 transfer service about which access to use should not depend on the type of consumer of the NAS and/or N2 transfer service because a service should be transparent to which entity requires it.

One solution to this the aforementioned problems is to that the AMF reject all NAS containers received from the SMF when the user equipment cannot be reached via an access type indicated by an identifier of the PDU session included in a header of the container. This approach adds additional signaling, which is unnecessary if the NAS container includes information that can be conveyed using the access type of an available PDU session such as PDU session release NAS containers or mobile terminated SMS message NAS containers. Furthermore, the SMF does not know whether the PCC rules used to form a NAS container according to one access type can be applied for NAS containers that are transmitted over other access types. Thus, if the AMF indicates that the access type is to be changed, the SMF is required to contact the PCF to update the PCC rules for the new access type. The additional signaling is unnecessary if the previously received PCC rules can be used to form NAS containers of both types.

Another problem arises when an SMS function (SMSF) or a location management function (LMF) attempts to send a non-3GPP specific NAS container to a user equipment. When the AMF receives a message that contains the NAS container and some additional parameters (e.g., as specified in TS 23.502 v15.2.0 clause 5.2.2.2.7) transmitted by the SMSF or LMF, the AMF is unable to determine whether the NAS container is specific to 3GPP access (in the case of LMF), is specific to non-3GPP access, or is access independent (in the case of SMSF) because none of the additional parameters transmitted with the NAS container include information indicating an access type for the message included in the NAS container.

FIGS. 1-14 disclose embodiments of a communication system in which access type control information is added to network function (NF) requests to send (NAS) signaling to the user equipment and/or N2 (NGAP) signaling to the access network that serves the user equipment. The access type control information allows the AMF to determine whether the NAS container is specific to 3GPP access, is specific to non-3GPP access, or is access independent. In some embodiments, the access type control information applies to enforce that NAS/N2 responses from the NF in a 5G core network shall be sent by the AMF on the same access as the one on which the NAS/N2 request has been received from the user equipment or access network that serves the user equipment. The access type parameter also eliminates or reduces unnecessary signaling between an access and mobility management function (AMF) and a session management function (SMF). Values of the parameter indicate an access type associated with the NAS container. In some embodiments, the value of the parameter indicates whether the NAS container is to be sent using 3GPP access, non-3GPP access, or either access type. In some embodiments, the AMF receives a service request from the user equipment in response to paging the user equipment or transmitting an NAS notification indicating non-3GPP access. The service request includes a list of PDU sessions associated with the user equipment. The list also indicates the PDU sessions that are transferable from non-3GPP access to 3GPP access.

The AMF receives a NAS container from the SMF and accesses the access type parameter in the message that carries the NAS container. If the access type indicates that the NAS container can be sent according to either 3GPP access or non-3GPP access and the list included in the service request indicates that the associated PDU session can be transferred to 3GPP access, the AMF switches the PDU session from non-3GPP to 3GPP access and forwards the NAS container to the user equipment via 3GPP access. If the access type indicates that the NAS container is to be sent using non-3GPP access and should not be sent using 3GPP access, the AMF rejects the NAS container and sends a message to the SMF indicating that the access type can be changed from non-3GPP access to 3GPP access. In response, the SMF generates a new NAS container according to policy and charging control (PCC) rules for 3GPP access. For example, the SMF can generate a request for new PCC rules for 3GPP access from a policy control function (PCF). In some embodiments, the PCF also transmits a parameter that indicates whether the PCC rules apply to both 3GPP access and non-3GPP access or are specific to one access. Alternatively, the PCF can transmit PCC rules for both 3GPP access and non-3GPP access in response to a request from the SMF. Either approach potentially reduces signaling between the SMF and the PCF.

FIG. 1 is a block diagram of a communication system 100 that supports selectively transmitting NAS containers via 3GPP access or non-3GPP access according to some embodiments. The communication system 100 provides support for both mobile and fixed access. As used herein, the term "mobile access" refers to accessing a communication system (e.g., the communication system 100) over an air interface. Mobile access can therefore be referred to as wireless access, mobile communication, wireless communication, or referred to with other similar terms. The term "fixed access" refers to accessing to a communication system using a device that is physically connected to the communication system, e.g., accessing a communication system such as the communication system 100 via wires, optical fibers, and the like. Fixed access can therefore be referred to as wireline access, wired communication, or referred to with other similar terms. The communication system 100 supports hybrid access that allows devices to concurrently access the communication system 100 using mobile access and fixed access. Some embodiments of the communication system 100 support 3GPP radio access and non-3GPP (wireless or fixed) access on an equal footing. User equipment will therefore be able to perform dual access by connecting to the 5G core network via concurrent 3GPP radio access and non-3GPP (wireless or fixed) access.

The communication system 100 includes a core network 105 that is accessible by either mobile or fixed devices using a common user plane access and a control plane that supports common authentication, authorization, and accounting (AAA) and policy control. The core network 105 includes an access and mobility management function (AMF) 110 that manages access control and mobility for devices in the communication system 100. Some embodiments of the AMF 110 handle registration management (RM) and connection management (CM) tasks, as discussed in detail below. The core network 105 also includes a session management function (SMF) 115 to set up and manage sessions in the communication system 100 according to network policies. An association between user equipment and the core network 105 can be represented as a packet data unit (PDU) session that can be managed by the SMF 115. The PDU session supports data connectivity between user equipment and a data network. The SMF 115 generate messages including NAS containers for transmission to the AMF 110. As discussed in detail below, the messages are associated with information that indicates whether the NAS containers are to be transmitted via 3GPP access, non-3GPP access, or both types of access.

The core network 105 also includes one or more user plane functions (UPF) 120 that can be deployed in the communication system 100 to provide services to users of the communication system 100. The core network 105 further includes a unified data manager (UDM) 125 that processes credentials, location management, subscription management, and the like. The UDM 125 stores data including user subscription data, such as subscription identifiers, security credentials, access and mobility related subscription data, and session related subscription data. Some embodiments of the core network 105 include other functionality such as a policy control function and a network function repository function, which are not shown in FIG. 1 in the interest of clarity. Some embodiments of the core network 105 are implemented using network function virtualization and software defined networking, as discussed herein. For example, different network slices can be used to instantiate different instances of the AMF 110, the SMF 115, the UPF 120, or the UDM 125 for different users or devices. Each PDU session is part of one network slice.

In the illustrated embodiment, a user equipment 130 has a wireless connection 140 to an access point 135. The wireless connection 140 is a non-3GPP access type such as a Wi-Fi connection. The access point 135 has a wired (non-3GPP) connection to network 145 that is capable of carrying Internet protocol (IP) traffic such as an Ethernet network. Some embodiments of the wired connection use line termination devices such as a digital subscriber line access multiplexer (DSLAM) or a gigabit passive optical network (GPON). The communication system 100 can therefore provide the user equipment 130 with access to the core network 105 via a non-3GPP access type.

The communication system 100 can also provide the user equipment 130 with mobile access to the core network 105, e.g., via a radio access network 150 that is connected to the AMF 110 over a corresponding interface such as an N2 interface. The radio access network 150 is also connected to the UPF 120 by a corresponding interface such as an N3 interface, which is not shown in FIG. 1 in the interest of clarity. The radio access network 150 provides wireless connectivity to the user equipment 130 via a wireless connection 155. The wireless connections 155 provides wireless connectivity according to a 3GPP access type.

An interworking function 165 is disposed between the network 140 and the core network 105. The interworking function 165 can also be referred to as a non-3GPP interworking function (N3IWF) because the interworking function 165 is used to connect the core network 105 to the access point that provides connectivity via non-3GPP access types. The interworking function 165 is configured to modify or translate messages conveyed from the fixed access user equipment to the core network 105 so that the fixed access user equipment appears to be accessing the core network 105 according to 3GPP standards or protocols from the perspective of the core network 105. The interworking function 165 is also configured to modify or translate messages conveyed from the core network 105 to the fixed access user equipment so that the messages received by the fixed access user equipment conform to corresponding non-3GPP standards or protocols. The interworking function 165 supports interfaces with the AMF 110 and the UPF 120.

The SMF 115 generates NAS containers and transmits the NAS containers to the AMF 110 and NAS messages. As used herein, an NAS layer is understood to be a protocol layer implemented in wireless communication protocol stacks between user equipment 130 and the core network 105. The NAS layer is the highest stratum of the control plane between the user equipment 130 and a mobility management entity (MME) or the AMF 110 at the radio interface. The NAS layer manages the establishment of communication sessions and maintains continuous communication as the user equipment moves through the network. Examples of functions supported by the NAS protocols include mobility of the user equipment 130 and session management procedures that are used to establish and maintain connectivity between the user equipment and a packet data network via the mobile data network. In contrast, an access stratum (AS) layer and corresponding AS protocol are used to convey information over an air interface in the wireless portion of the network. The NAS protocol is transported using radio resource control (RRC) messages in Second Generation (2G), Third Generation (3G), Fourth Generation (4G), and 5G networks that operate according to the standards defined by the Third Generation Partnership Project (3GPP).

One or more NAS links are used to convey NAS messages between the user equipment 130, 135 and the AMF 110, which are the terminating endpoints of the NAS links. The user equipment 130 can therefore communicate with the core network 105 using NAS messages that are conveyed via a first NAS link that traverses the access point 135. Some embodiments of the user equipment 130 support multiple concurrent NAS links with the AMF 110. For example, the user equipment 130 and the AMF 110 can concurrently support a mobile NAS link and a non-3GPP NAS link.

Prior to establishing an NAS link, the user equipment 130 transmits an NAS registration message to register with the AMF 110. The NAS registration message can include information that is used to perform authorization (and, in some cases, authentication) of the user equipment. The registration message can also be used to register the user equipment with an SMS service function (SMSF) 170 for SMS messaging. Registration of the user equipment with the AMF 110 also includes generating or provisioning an encryption key and an integrity key for the user equipment and the AMF 110. The encryption key and the integrity key are used to provide secure transfer over the NAS link, as discussed herein.

Once registered, the user equipment 130 is registration management (RM)-connected. The user equipment 130 can subsequently establish connectivity with the AMF 110 via the 5G-AN (Access Network) supporting an Access Type, in which case the user equipment 130 is connection management (CM)-connected over that Access Type. The user equipment 130 can also be in an RM-connected CM-idle state (in which case there is no established signaling path to carry NAS signaling over the access). However, the non-3GPP protocols differ from the 3GPP protocols because the UE cannot be paged via non-3GPP access in this state (so cannot be put CM-Connected under request of the 5G Core), whereas a user equipment 130 in the 3GPP RM-registered CM-idle state can be paged by the core network 105 via 3GPP access.

As discussed above, several problems arise due to the distinction between 3GPP and non-3GPP access types. At least in part to address these problems, services that are responsible for sending signaling to the user equipment 130 or an access network 150 serving the user equipment 130 receive requests to send the signaling to the user equipment 130 or the access network together with access type control information indicating whether the signaling may be sent using any access type or is to be sent using a specific access type provided in the request. In some embodiments, the service is implemented in the AMF 110, The AMF 110 receives a request to transfer N2 and/or NAS messages from the SMF 115 including NAS and/or N2 containers and an access type control parameter that indicates whether the N2 and/or NAS container is to be sent using only non-3GPP access, only 3GPP access, or if it may be transmitted using either non-3GPP access or 3GPP access.

The service that is responsible for sending the signal then selectively forwards the signaling to the user equipment 130 or the access network 150 based on the access type control information. The access type control information indicates whether the signaling is transmittable via any of a plurality of access types (such as 3GPP and non-3GPP) or a specific access type, e.g., only via non-3GPP access. In some cases, the service detects that it is not possible to send the signaling via the specific access type provided in the request when at least one of following conditions applies:

(i) the user equipment is not in CONNECTED state over via the specific access type and either the user equipment cannot be paged via the specific access type or the user equipment does not answer to paging over the specific access type, and (ii) the user equipment is in CONNECTED state via the specific access type and the access network indicates a failure of access network paging.

If the access type control parameter indicates that the N2 and/or NAS container may be transmitted using any of the plurality of access types (e.g. using either non-3GPP access or 3GPP access), the service tries to send the signaling via a first one of the plurality of access types and when this is not possible it tries to send the signaling via a second one of the plurality of access types.

Figure 2:
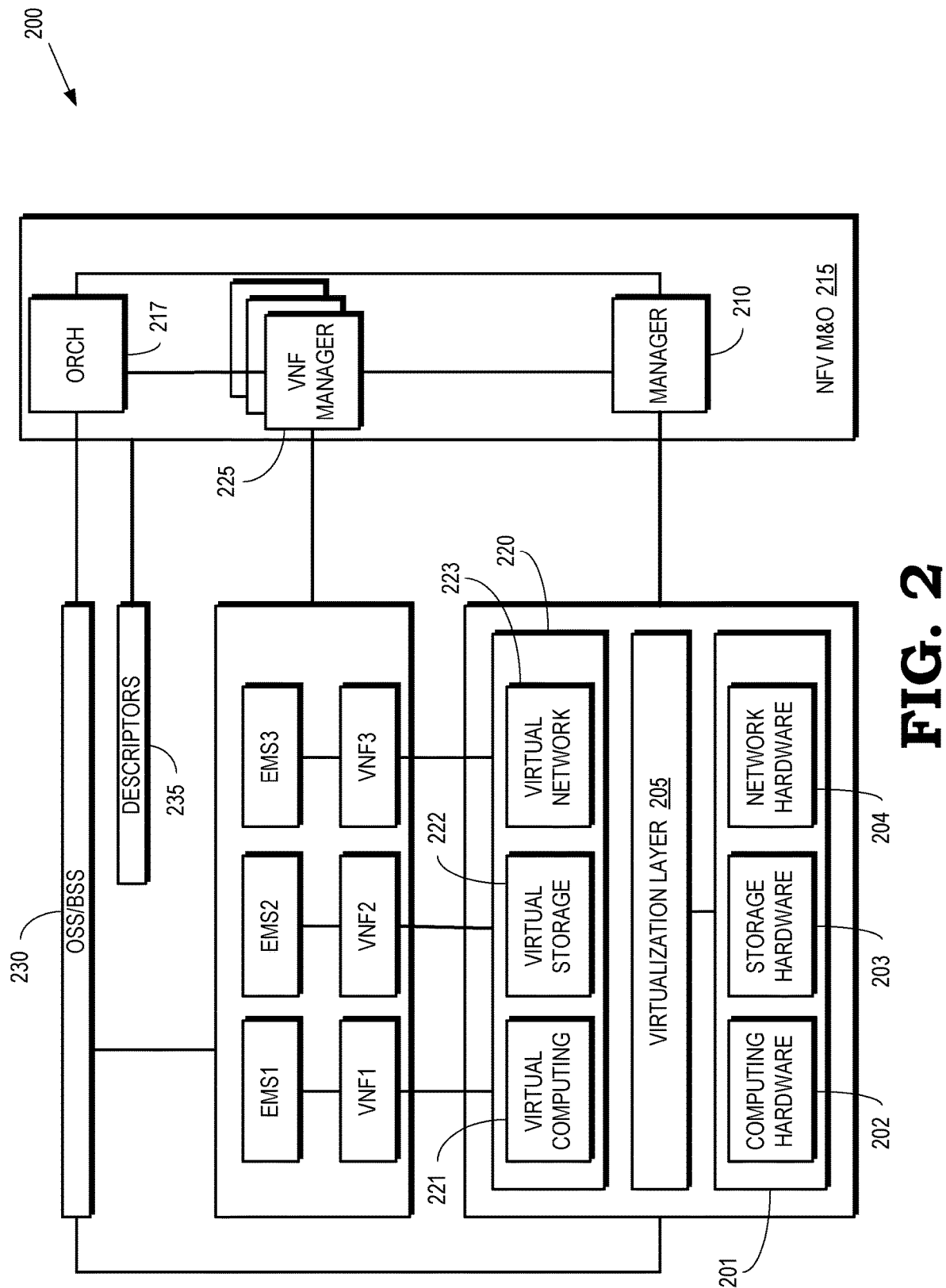
FIG. 2 is a block diagram of a network function virtualization (NFV) architecture according to some embodiments.

FIG. 2 is a block diagram of an NFV architecture 200 according to some embodiments. The NFV architecture 200 is used to implement some embodiments of the communication system 100 shown in FIG. 1. The NFV architecture 200 includes hardware resources 201 including computing hardware 202 such as one or more processors, storage hardware 203 such as one or more memories, and network hardware 204 such as one or more transmitters, receivers, or transceivers. A virtualization layer 205 provides an abstract representation of the hardware resources 201. The abstract representation supported by the virtualization layer 205 can be managed using a virtualized infrastructure manager 210, which is part of the NFV management and orchestration (M&O) module 215. Some embodiments of the manager 210 are configured to collect and forward performance measurements and events that may occur in the NFV architecture 200. For example, performance measurements may be forwarded to an orchestrator (ORCH) 217 implemented in the NFV M&O 215. The hardware resources 201 and the virtualization layer 205 may be used to implement virtual resources 220 including virtual computing 221, virtual storage 222, and virtual networking 223.

Virtual networking functions (VNF1, VNF2, VNF3) run over the NFV infrastructure (e.g., the hardware resources 201) and utilize the virtual resources 220. For example the virtual networking functions (VNF1, VNF2, VNF3) may be implemented using virtual machines supported by the virtual computing resources 221, virtual memory supported by the virtual storage resources 222, or virtual networks supported by the virtual network resources 223. Element management systems (EMS1, EMS2, EMS3) are responsible for managing the virtual networking functions (VNF1, VNF2, VNF3). For example, the element management systems (EMS1, EMS2, EMS3) may be responsible for fault and performance management. In some embodiments, each of the virtual networking functions (VNF1, VNF2, VNF3) is controlled by a corresponding VNF manager 225 that exchanges information and coordinates actions with the manager 210 or the orchestrator 217.

The NFV architecture 200 may include an operation support system (OSS)/business support system (BSS) 230. The OSS/BSS 230 deals with network management including fault management using the OSS functionality. The OSS/BSS 230 also deals with customer and product management using the BSS functionality. Some embodiments of the NFV architecture 200 use a set of descriptors 235 for storing descriptions of services, virtual network functions, or infrastructure supported by the NFV architecture 200. Information in the descriptors 235 may be updated or modified by the NFV M&O 215.

The NFV architecture 200 can be used to implement network slices that provide control plane functions, such as instances of the AMF 110, the SMF 115, the UPF 120, or the UDM 125 shown in FIG. 1. A network slice is a complete logical network that provides communication services and network capabilities, which can vary from slice to slice. User equipment can concurrently access multiple slices. Some embodiments of user equipment provide Network Slice Selection Assistance Information (NSSAI) parameters to the network to assist in selection of a slice instance for the user equipment. A single NSSAI may lead to the selection of several slices. The NFV architecture 200 can also use device capabilities, subscription information and local operator policies to do the selection. An NSSAI is a collection of smaller components, Single-NSSAIs (S-NSSAI), which each include a Slice Service Type (SST) and possibly a Slice Differentiator (SD). Slice service type refers to an expected network behavior in terms of features and services (e.g., specialized for broadband or massive IoT), while the slice differentiator can help selecting among several network slice instances of the same type, e.g. to isolate traffic related to different services into different slices.

Figure 3A:
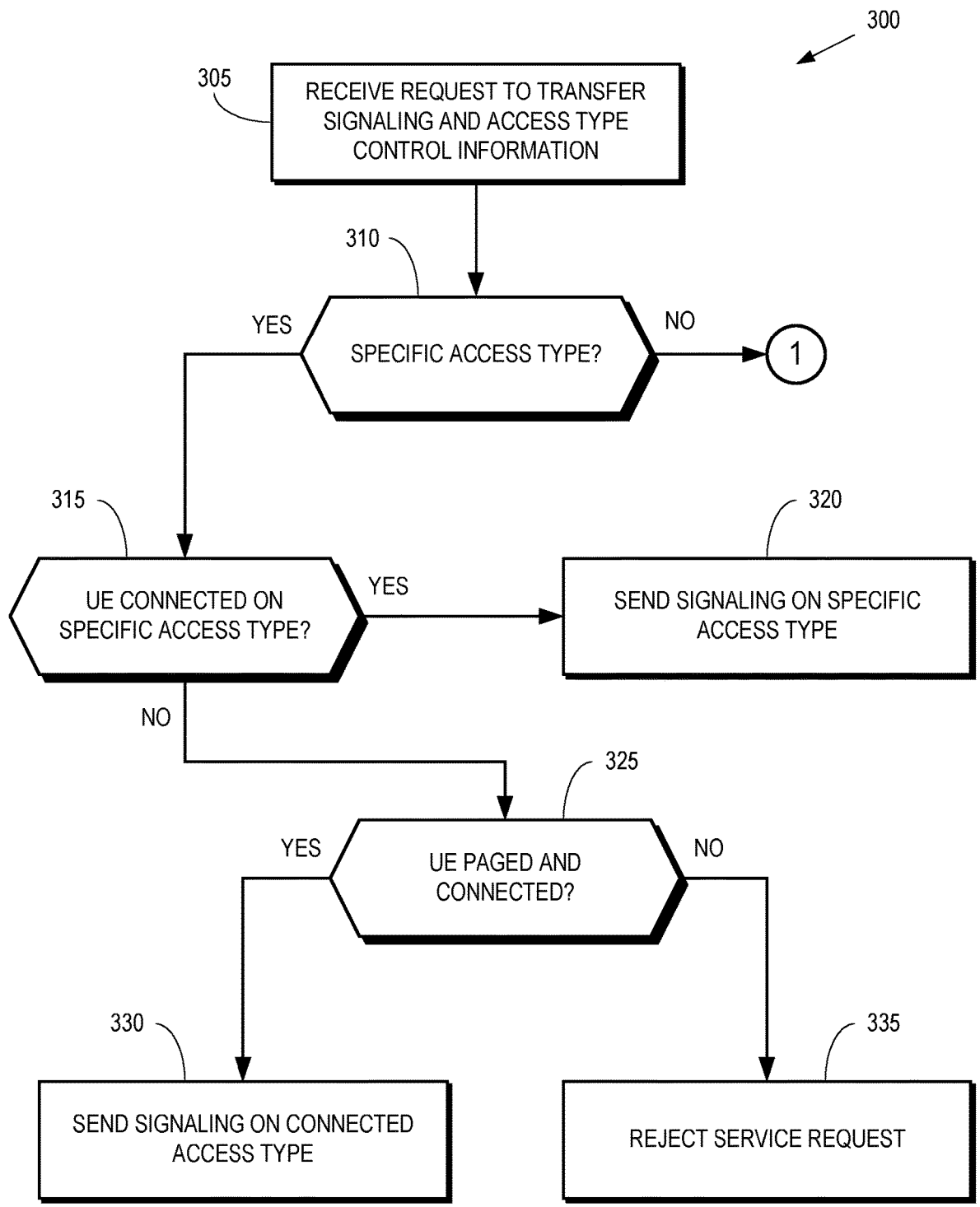
FIGS. 3A and 3B are a flow diagram of a method of selectively transmitting an NAS container based on access type control information associated with an NAS message that includes the NAS container according to some embodiments.

FIG. 3A is a flow diagram of a first portion of a method 300 of selectively transmitting an NAS container based on access type control information associated with an NAS message that includes the NAS container according to some embodiments. The method 300 is implemented in some embodiments of the communication system 100 shown in FIG. 1. An AMF is used as an example of a service that is responsible for providing signaling to a user equipment or and access network serving the user equipment. However, in other cases, other entities are used to implement the service.

At block 305, the AMF transfer service receives a service request to transfer signaling. The AMF transfer service also receives associated access type control information such as an access type parameter.

At decision block 310, the AMF determines whether the access type control information indicates that a specific access type is to be used for transmitting the NAS container. If so, the method 300 flows to decision block 315. If the access type control information does not indicate that a specific access type is to be used, e.g., the access type control information indicates that any of a set of access types can be used, the method 300 flows to node 1 (see FIG. 3B).

At decision block 315, the AMF determines whether the user equipment is connected on the access type specified in the access type control information. If so, the method 300 flows to block 320 and signaling (such as the NAS message) is transmitted via the specific access type indicated by the access type control information. If the user equipment is not connected, the method 300 flows to decision block 325.

At decision block 325, the user equipment is paged (if possible). The AMF determines whether the paging attempt succeeded and the user equipment is connected via the access type used for the paging attempt. If so, the method 300 flows to block 330 and signaling (such as the NAS message) is transmitted via the access type used for the paging attempt. If not, e.g., if the user equipment cannot be paged or the page is not successful, the method 300 flows to block 335 and the service request is rejected.

Figure 3B:
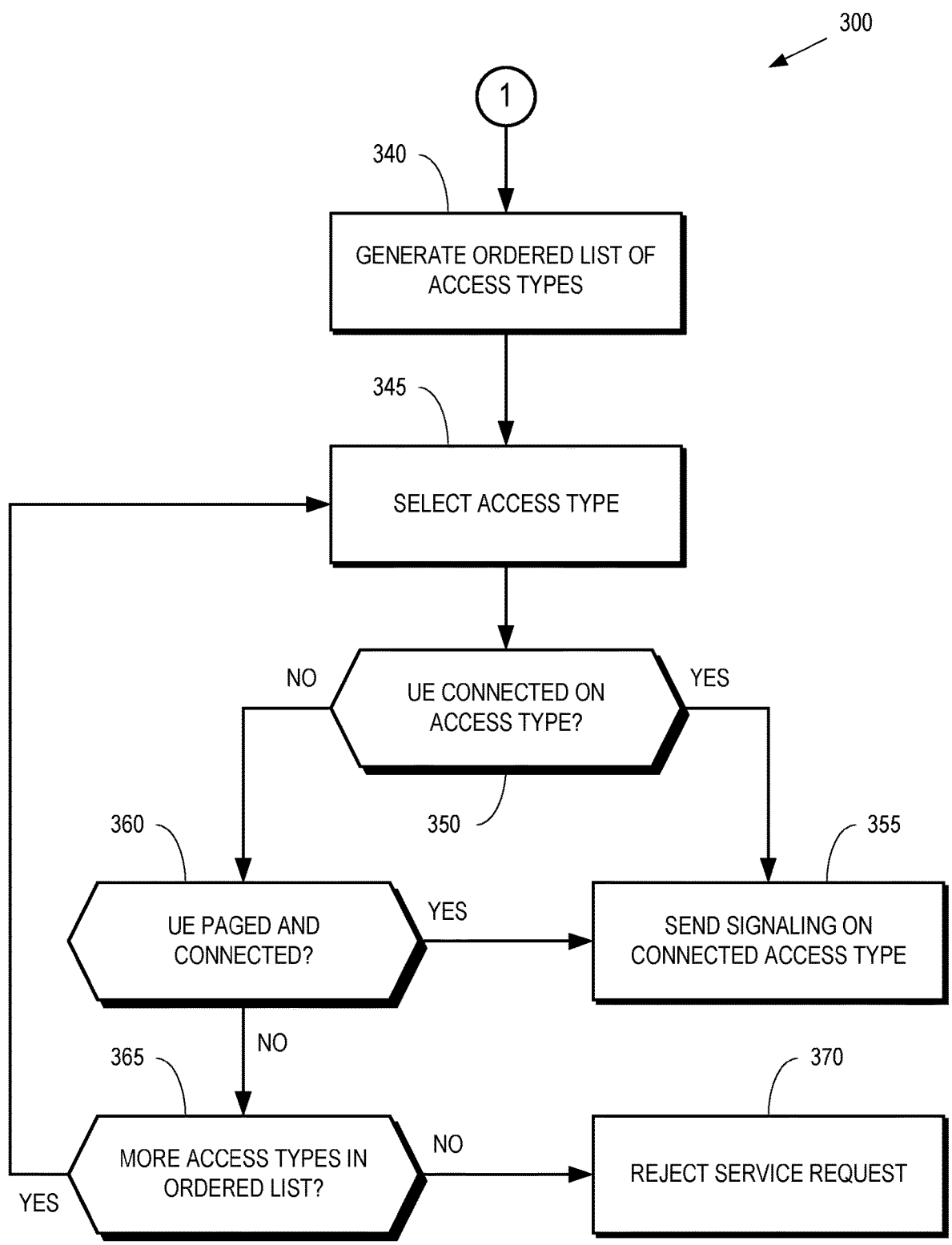

FIG. 3B is a flow diagram of a second portion of the method 300 of selectively transmitting an NAS container based on access type control information associated with an NAS message that includes the NAS container according to some embodiments. The second portion of the method 300 begins at the node 1, which corresponds to the node 1 shown in FIG. 3A. As discussed above, the method 300 flows to node 1 in response to the access type control information indicating that any of a set of access types can be used to transmit signaling such as the NAS message.

At block 340, the AMF generates an ordered list of the access types indicated in the access type control information. The access types can be ordered based on any criteria including priorities associated with the different access types. At block 345, the AMF selects an access type from the ordered list of access types. For example, the AMF can select the highest priority access type remaining in the ordered list of access types.

At decision block 350, the AMF determines whether the user equipment is connected on the access type that was selected in block 345. If so, the method 300 flows to the block 355 and signaling (such as the NAS message) is transmitted via the selected access type. If not, the method 300 flows to decision block 360.

At decision block 360, the user equipment is paged (if possible). The AMF determines whether the paging attempt succeeded and the user equipment is connected via the access type used for the paging attempt. If so, the method 300 flows to block 355 and signaling (such as the NAS message) is transmitted via the access type used for the paging attempt. If not, e.g., if the user equipment cannot be paged or the page is not successful, the method 300 flows to block 365.

At decision block 365, the AMF determines whether there are more access types in the ordered list that have not been used for a connection attempt. If so, the method 300 flows to block 345 and another access type is selected from the ordered list of access types. If not, the method 300 flows to block 370 and the service request is rejected.

Figure 4:
FIG. 4 is a block diagram of an NAS message that is associated with an access type parameter according to some embodiments.

FIG. 4 is a block diagram of an NAS message 400 that is associated with an access type parameter 410 according to some embodiments. The NAS message 400 includes an NAS container 405 and is transmitted from an SMF to an AMF, such as the SMF 115 and the AMF 110 shown in FIG. 1. The AMF selectively forwards the NAS container 405 based on a value of the access type parameter 410. For example, if the user equipment that is receiving the NAS container 405 is in an RM-registered, CM-idle mode for non-3GPP access, the AMF forwards the NAS container 405 via 3GPP access in response to the access type parameter 410 indicating that the NAS container 405 is transmittable via 3GPP access or both non-3GPP and 3GPP access. In the illustrated embodiment, a header 415 includes other information such as an identifier of the user equipment, an identifier of a PDU session used to transmit the message 400, and the like.

Figure 5:
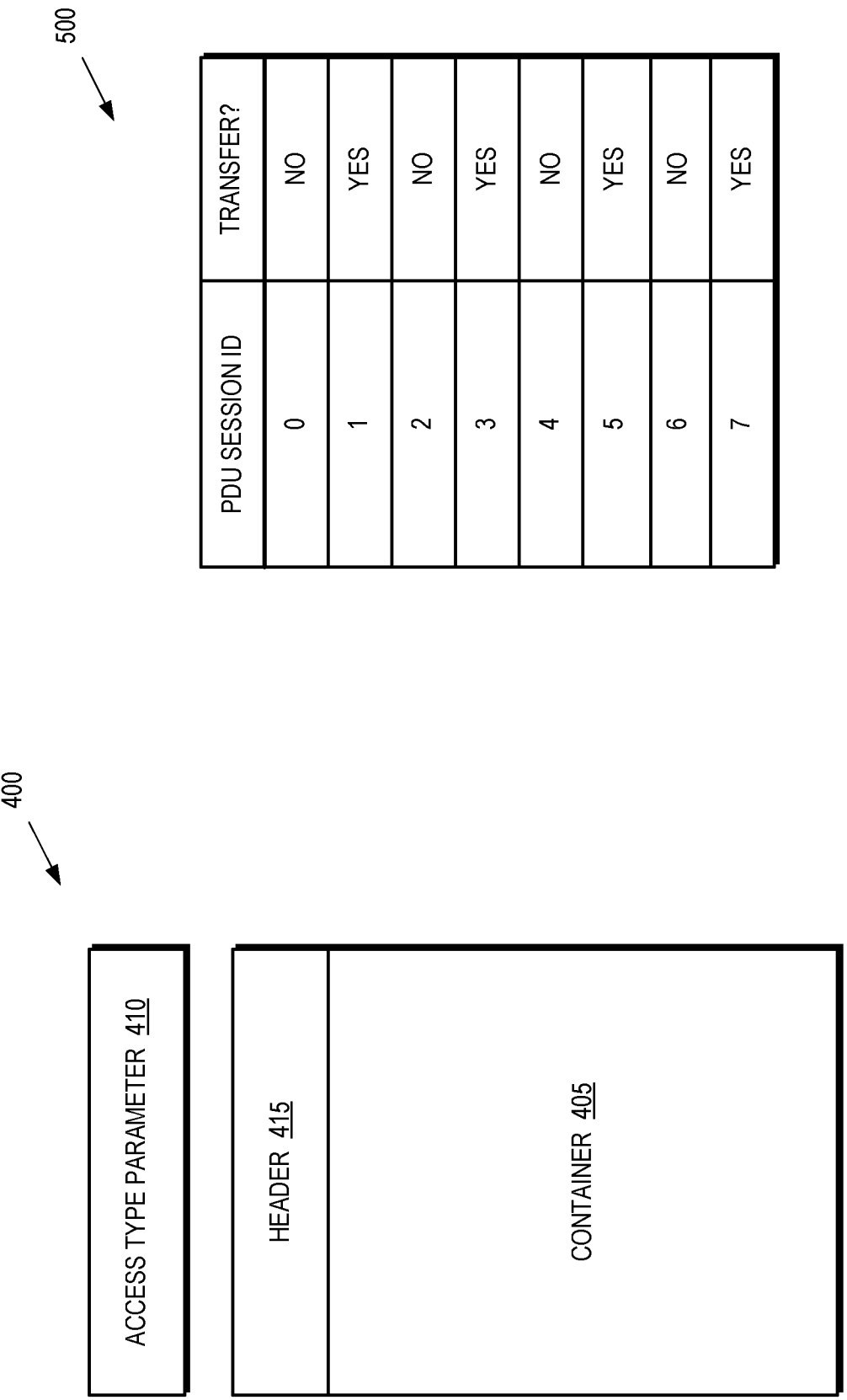
FIG. 5 is a block diagram of a list of protocol data unit (PDU) sessions that is transmitted from a user equipment to an access and mobility management function (AMF) and the service request according to some embodiments.

FIG. 5 is a block diagram of a list 500 of PDU sessions that is transmitted from a user equipment to an AMF and the service request according to some embodiments. The list 500 is transmitted by some embodiments of the user equipment 130, 135 shown in FIG. 1. The list 500 includes identifiers of PDU sessions that are available at the user equipment. For example, the list 500 identifies PDU sessions 0, 1, 2, 3, 4, 5, 6, 7 that are available to the user equipment for non-3GPP access. In the illustrated embodiment, the list 500 also includes information indicating which of the PDU sessions 0-7 are transferable from non-3GPP access to 3GPP access. For example, the information indicates that the PDU sessions 1, 3, 5, 7 are transferable from non-3GPP access to 3GPP access.

Figure 6:
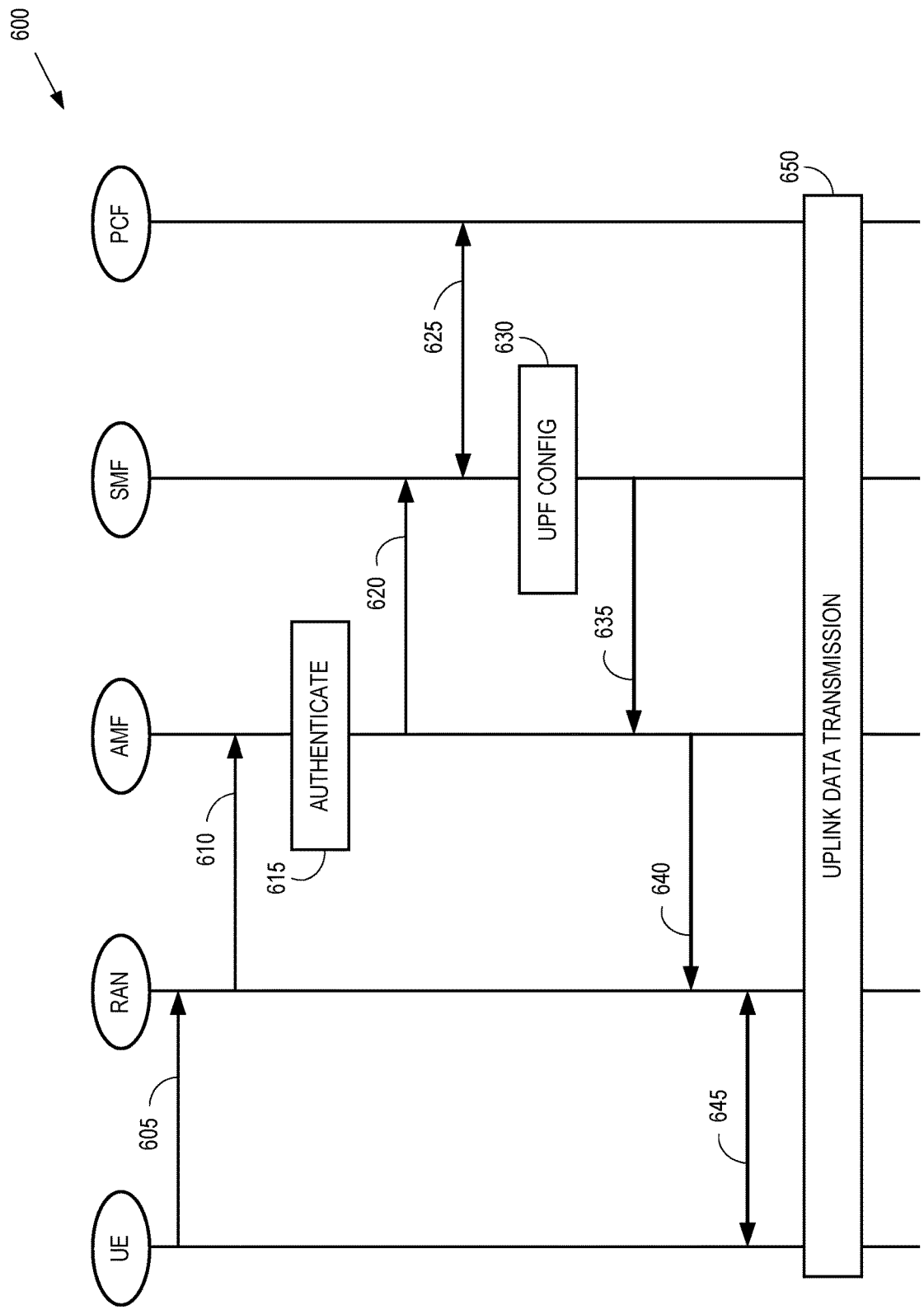
FIG. 6 is a message flow for a user equipment triggered service access procedure according to some embodiments.

FIG. 6 is a message flow 600 for a user equipment triggered service access procedure according to some embodiments. The message flow 600 is implemented in some embodiments of the communication system 100 shown in FIG. 1. In the illustrated embodiment, the message flow 600 represents a service request procedure that is triggered by the user equipment and used to send uplink signaling messages or as a response to a network paging request. In the interest of clarity, some of the messages used in the service request procedure are not illustrated in FIG. 6. A more detailed description including the omitted messages is found in specified in § 4.2.3.2 and FIG. 4.2.3.2-1 of 3GPP TS 23.502 v15.2.0, which is incorporated herein by reference in its entirety.

The user equipment initiates the service request procedure by transmitting a service request 605 to a radio access network (RAN). The service request 605 includes a list of PDU sessions to be activated, a list of allowed PDU sessions, security parameters, PDU session status, and the like. Some embodiments of the service request 605 also include information indicating which of the PDU sessions is transferable from non-3GPP access to 3GPP access.

The RAN then transmits a message 610 including (or based upon) the service request 605 received from the user equipment. The message 610 is transmitted to an AMF that is registered with the user equipment. For example, the user equipment can be RM-registered with the AMF for 3GPP access and non-3GPP access. In some cases, such as when the service request 605 was not sent with integrity protection or verification of the integrity protection failed, the AMF performs (at block 615) an authentication and authorization process. For example, the AMF can generate a security context for the user equipment.

The AMF transmits a request 620 to update a context for a PDU session associated with the user equipment. The request 620 includes PDU session identifiers, operation types, location information for the user equipment, an access type, a radio access technology type, presents information, and the like.

The information conveyed in the request 620 depends on whether the paging or notification of the user equipment indicated non-3GPP access. If the procedure was triggered in response to paging or NAS Notification indicating non-3GPP access, and the PDU Session for which the user equipment was paged or notified is not in the List Of Allowed PDU Sessions provided by the user equipment, the AMF notifies the SMF that that the user equipment is not reachable. For other PDU Sessions in the List Of Allowed PDU Sessions the Service Request Procedure succeeds without re-activating the User Plane of any PDU Sessions. If the procedure was triggered in response to paging or NAS notification indicating non-3GPP access, and the PDU Session for which the UE was paged or notified is in the List Of Allowed PDU Sessions provided by the UE, the AMF proceeds as follows:

If the Allowed Access Type in the Namf_Communication_N1N2MessageTransfer were set to "non-3GPP access", the AMF notifies the SMF that the access type of the PDU session can be changed and discards any already received N1 SM Container and N2 SM Information;

If the Allowed Access Type in the Namf_Communication_N1N2MessageTransfer were set to "any access", the AMF shall send the N1 SM Container after the Service request procedure is complete, using Downlink NAS Transport message (as part of related SM procedures, not shown in the call flow).

In some embodiments, the SMF initiates a policy association modification 625, which is a conditional step and is not necessarily performed in all cases. If the AMF notified the SMF that the access type of the PDU session can be changed from non-3GPP to 3GPP, and if PCC is deployed, the SMF shall perform an SMF initiated SM Policy Association Modification procedure (as defined in clause 4.16.5.1 of TS 23.502) to provide information on the Policy Control Request Trigger condition(s) that have been met (e.g. change of Access Type in the case of PDU session(s) moved from 3GPP access to non-3GPP access. The PCF may provide updated PCC Rule.

For a PDU Session for which the SMF has determined that a new N1 SM container has to be sent again over the new access, the AMF shall send the N1 SM Container after the service request procedure is completed, using Downlink NAS Transport message (as part of related SM procedures, not shown in the call flow).

For a PDU Session that the SMF has determined to accept the activation of a user plane (UP) connection, N2 SM Information is sent in a subsequent message 635.

At block 630, the SMF performs configuration of a UPF. In some cases, configuring the UPF includes selecting a UPF, changing from one UPF to a new UPF, and the like.

The SMF responds to the request 620 by transmitting a response 635. Some embodiments of the message are a PDU session update context response message that includes information such as PDU session identifiers, quality-of-service (QoS) profiles, network slice identifiers, and the like.

The AMF transmits a request 640 that includes information received from the SMF in the response 635, security context, network slice information for the access type of the user equipment, and the like.

At step 645, the RAN performs radio resource control (RRC) connection reconfiguration with the user equipment, which may depend on the QoS information for all the QoS flows of the PDU sessions of activated uplink connections. Uplink data transmission is performed in block 650.

Figure 7:
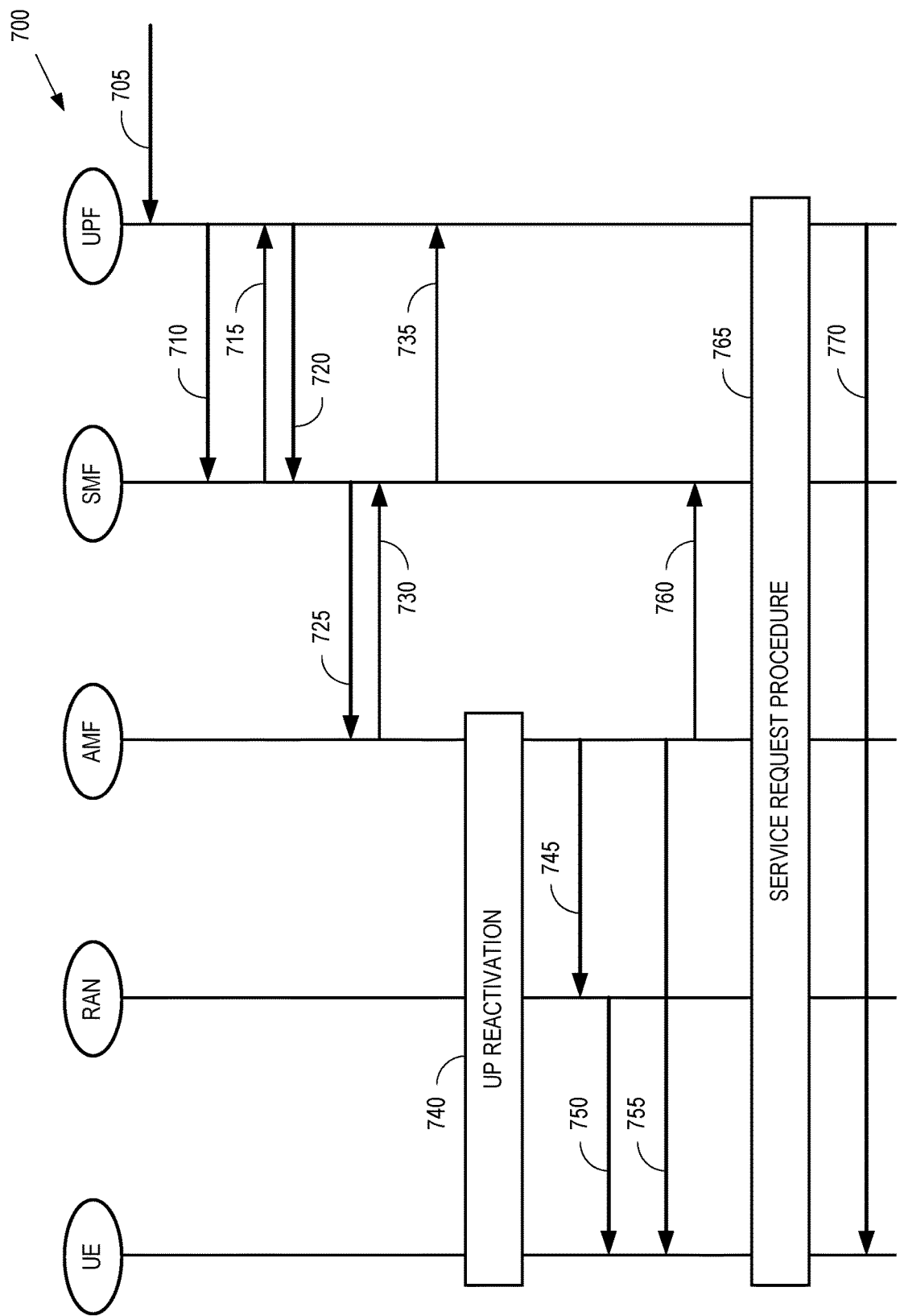
FIG. 7 is a message flow for a network triggered service access request according to some embodiments.

FIG. 7 is a message flow 700 for a network triggered service access request according to some embodiments. The message flow 700 is implemented in some embodiments of the communication system 100 shown in FIG. 1. In the illustrated embodiment, the message flow 700 represents a service request procedure that is triggered by the network when the network needs to signal to deliver mobile terminating user data. In the interest of clarity, some of the messages used in the service request procedure are not illustrated in FIG. 7. A more detailed description including the omitted messages is found in specified in § 4.2.3.3 and FIG. 4.2.3.3-1 of 3GPP TS 23.502 v15.2.0, which is incorporated herein by reference in its entirety.

A UPF receives downlink data 705 that is addressed to a user equipment. In response to receiving the downlink data 705, the UPF sends a data notification 710 that includes a session identifier, QoS information for the downlink packets, and the like. The data notification 710 is sent to an SMF, which acknowledges receipt of the data notification 710 by transmitting a data notification acknowledgment 715 to the UPF. In response to receiving the data notification acknowledgment 715, the UPF forwards the downlink packets to the SMF at step 720.

In the illustrated embodiment, the SMF sends an NAS message 725 to the AMF that includes a PDU session identifier and an access type parameter that indicates allowed access types for transmitting an NAS container included in the NAS message 725. For example, the access type parameter can indicate that the NAS container is only transmittable via 3GPP access, only transmittable via non-3GPP access, or transmittable via either 3GPP or non-3GPP access. As discussed herein, the SMF is an example of a network function (NF) and in some embodiments the NF sends the NAS message 725 to the AMF including the PDU session identifier and the access type parameter.

The AMF response to the NAS message 725 by transmitting a response 730 to the SMF. The contents of the response 730 depend on the state of the user equipment.

- If the UE is in CM-IDLE state at the AMF, and the AMF is able to page the UE the AMF sends a Namf_Communication_N1N2MessageTransfer response to the SMF immediately with a cause "Attempting to reach UE" which indicates the SMF that the N2 SM information provided in step 3a, may be ignored by the AMF once the UE is reachable and the SMF may be asked to provide the N2 SM information again.
- While waiting for the UE to respond to a previous paging request, if the AMF receives an Namf_Communication_N1N2MessageTransfer Request message with the same or a lower priority than the previous message triggering the paging, or if the AMF has determined not to trigger additional paging requests for this UE based on local policy, the AMF rejects the Namf_Communication_N1N2MessageTransfer Request message.
- If the UE is in CM-CONNECTED state at the AMF then the AMF sends a Namf_Communication_N1N2MessageTransfer response to the SMF immediately with a cause "N1/N2 transfer success".
- If the UE is in CM-IDLE state, and the AMF determines that the UE is not reachable for paging, the AMF shall send an Namf_Communication_N1N2MessageTransfer response either to the SMF, or to other network functions from which AMF received the request message in step 3a, or the AMF performs asynchronous type communication and stores the UE context based on the received message. If asynchronous type communication is invoked, the AMF initiates communication with the UE and (R)AN when the UE is reachable e.g. when the UE enters CM-CONNECTED state.
- If the AMF has determined the UE is unreachable for the SMF via the Allowed Access Type (e.g., due to the UE in MICO mode or the UE is only registered over non-3GPP access and its state is CM-IDLE), then the AMF rejects the request from the SMF. The AMF may include in the reject message an indication that the SMF need not trigger the Namf_Communication_N1N2MessageTransfer Request to the AMF, if the SMF has not subscribed to the event of the UE reachability. The AMF stores an indication that the SMF has been informed that the UE is unreachable.
- If the UE is not in MICO mode and the AMF detects the UE is in a Non-Allowed Area unless the request from the SMF is for regulatory prioritized service, the AMF rejects the request from the SMF and notifies the SMF that the UE is reachable only for regulatory prioritized service. The AMF stores an indication that the SMF has been informed that the UE is reachable only for regulatory prioritized service.
- If the Registration procedure with AMF change is in progress when the old AMF receives the Namf_Communication_N1N2MessageTransfer, the old AMF may reject the request with an indication that the Namf_Communication_N1N2MessageTransfer has been temporarily rejected.
- Upon reception of an Namf_Communication_N1N2MessageTransfer response with an indication that its request has been temporarily rejected, the SMF shall start a locally configured guard timer and wait for any message to come from an AMF. Upon reception of a message from an AMF, the SMF shall re-invoke the Namf_Communication_N1N2MessageTransfer (with N2 SM info) to the AMF from which it received the message. Otherwise the SMF takes the step 3c at expiry of the guard timer. If the SMF decides that the control plane buffering applies, the SMF shall request UPF to start forwarding the downlink data PDU towards the SMF.

The SMF transmits a message 735 in response to receiving the response 730. If the SMF receives an indication from the AMF that the UE is unreachable or reachable only for regulatory prioritized service, the message 735 transmitted by the SMF may, based on network policies, either:

- indicate to the UPF to stop sending Data Notifications;
- indicate to the UPF to stop buffering DL data and discard the buffered data;
- indicate to the UPF to stop sending Data Notifications and stop buffering DL data and discard the buffered data; or
- refrains from sending further Namf_Communication_N1N2MessageTransfer message for DL data to the AMF while the UE is unreachable for the Allowed Access Type.

If the user equipment is in a CM-connected state and the access associated with the PDU session identifier received from the SMF, the user plane connection for this PDU session is activated at step 740.

If the user equipment is in a CM-idle state in 3GPP access and the PDU session identifier received from the SMF is associated with 3GPP access, the AMF sends a notification 745 to RAN, which then sends a notification 750 to the user equipment. For example, the AMF can page the user equipment.

If the user equipment is concurrently registered over a 3GPP and non-3GPP access is in the same public land mobile network (PLMN) and the user equipment is in eight CM-connected state in 3GPP access and the PDU session identifier is associated with non-3GPP access, the AMF sends a NAS notification 755 containing the non-3GPP access type to the user equipment.

If the user equipment does not respond to the notification 755 within a predetermined time interval (e.g., as indicated by a timer that is initiated in response to sending the NAS notification 755), the AMF sends a failure notification 760 to the SMF.

The user equipment initiates a user equipment triggered service request procedure (as discussed herein with regard to FIG. 6) at block 765. The UPF then transmits buffered downlink data 770 towards the user equipment via the RAN that perform the service request procedure.

Figure 8:
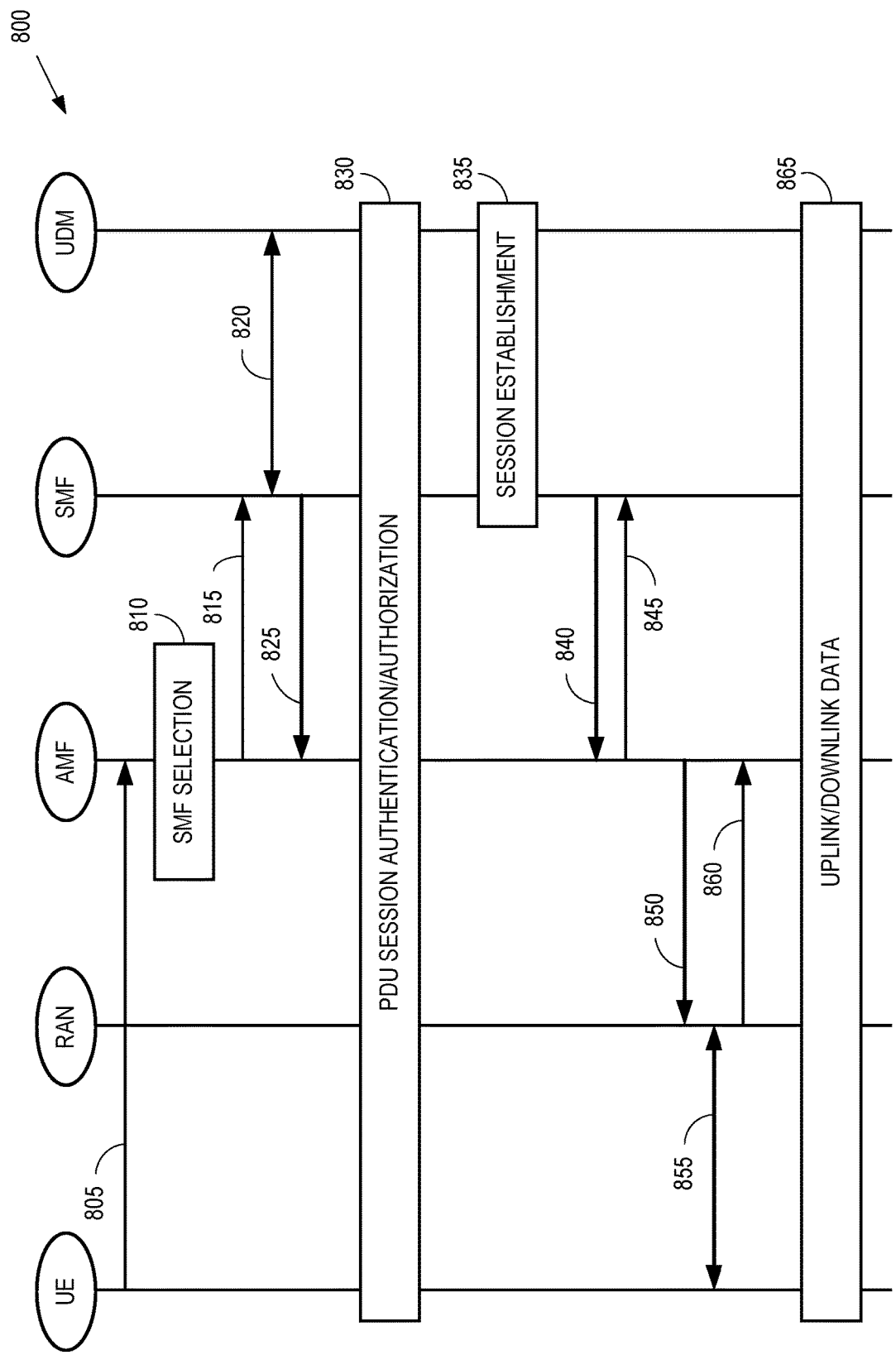
FIG. 8 is a message flow for PDU session establishment in non-roaming and roaming cases according to some embodiments.

FIG. 8 is a message flow 800 for PDU session establishment in non-roaming and roaming cases according to some embodiments. The message flow 800 is implemented in some embodiments of the communication system 100 shown in FIG. 1. In the interest of clarity, some of the messages used for PDU session establishment are not illustrated in FIG. 8. A more detailed description including the omitted messages is found in specified in § 4.3.2.2.1 and FIG. 4.3.2.2.1-1 of 3GPP TS 23.502 v15.2.0, which is incorporated herein by reference in its entirety.

The user equipment transmits a PDU session establishment request 805 to the AMF, which selects an SMF to support the session at block 810.

The AMF transmits a PDU session request 815 that is used to instruct the SMF to create a context for the PDU session. The SMF registers the PDU session with a UDM, as indicated by the double-headed arrow 820. The SMF then provides a response 825 to the request 815 indicating that the PDU session establishment request has been processed.

In some embodiments, an authorization/authentication procedure is performed at block 830 to authorize and authenticate the user equipment for communication in the network. A session establishment process is then performed at block 835. The message exchange is performed in blocks 830, 835 are disclosed in more detail in 3GPP TS 23.502.

The SMF sends a message 840 to the AMF including a PDU session identifier and an access type parameter indicating allowed access type for the associated PDU session. In some embodiments, the SMF sends an Namf_Communication_N1N2MessageTransfer (PDU Session ID, Allowed Access Type, N2 SM information (PDU Session ID, QFI(s), QoS Profile(s), CN Tunnel Info, S-NSSAI from the Allowed NSSAI, Session-AMBR, PDU Session Type, User Plane Security Enforcement information, UE Integrity Protection Maximum Data Rate), N1 SM container (PDU Session Establishment Accept (QoS Rule(s) and QoS Flow level QoS parameters if needed for the QoS Flow(s) associated with the QoS rule(s), selected SSC mode, S-NSSAI(s), DNN, allocated IPv4 address, interface identifier, Session-AMBR, selected PDU Session Type, Reflective QoS Timer (if available), P-CSCF address(es)))). If multiple UPFs are used for the PDU Session, the CN Tunnel Info contain tunnel information related with the UPF that terminates N3.

The Namf_Communication_N1N2MessageTransfer contains the Allowed Access Type allowing the AMF to know which access towards the UE to use.

The AMF transmits a response 845 to the message 840. The AMF also sends a PDU session request as an NAS message 850 to the RAN, which performs a resource set up procedure 855 with the user equipment. Once the user equipment has been configured for the PDU session, the user equipment responds with a PDU session request acknowledgment 860. Uplink and downlink data are then exchanged in the block 865.

Figure 9:
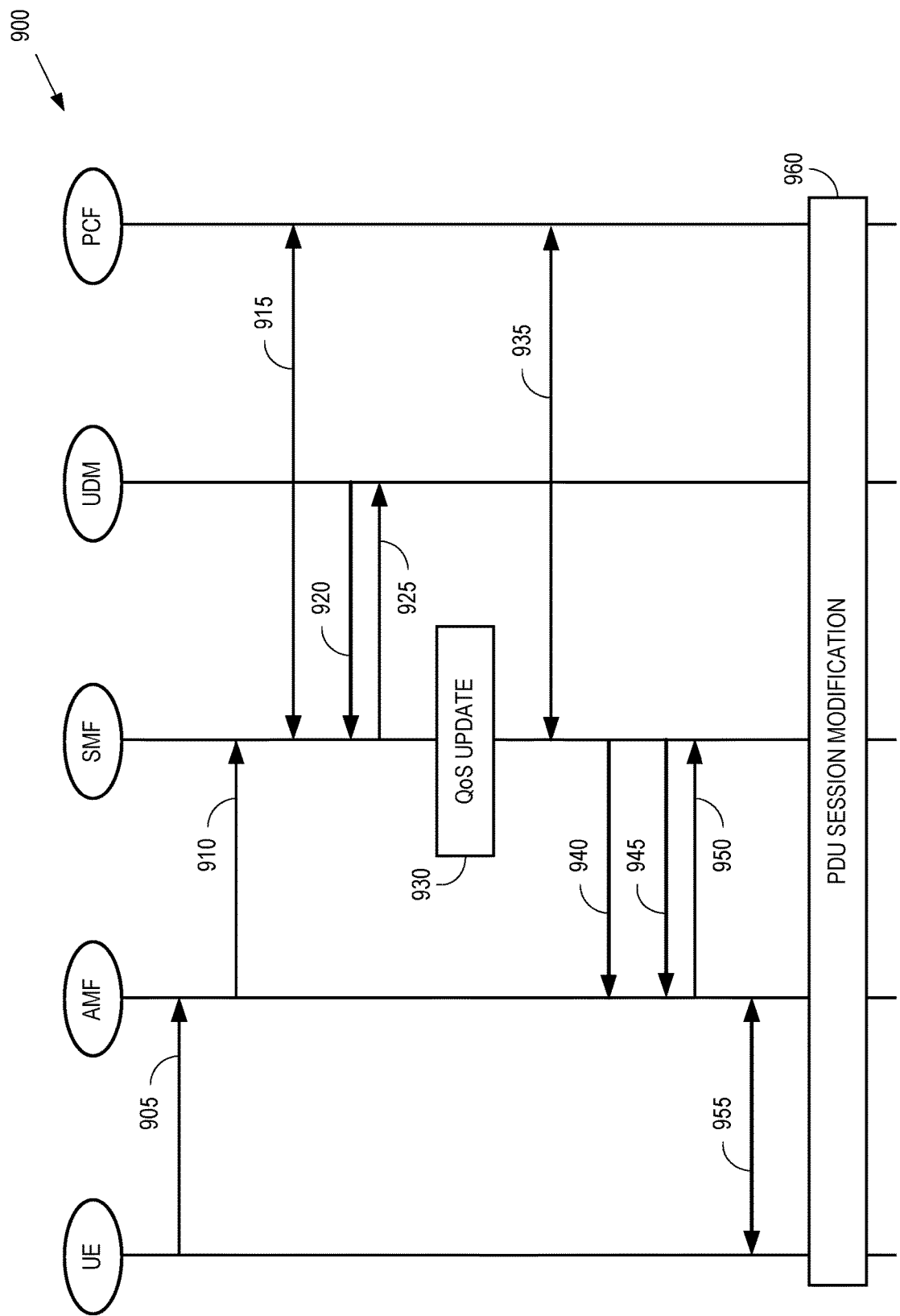
FIG. 9 is a message flow for user equipment or network requested PDU session modification according to some embodiments.

FIG. 9 is a message flow 900 for user equipment or network requested PDU session modification according to some embodiments. The message flow 900 is implemented in some embodiments of the communication system 100 shown in FIG. 1. In the interest of clarity, some of the messages used for PDU session establishment are not illustrated in FIG. 9. A more detailed description including the omitted messages is found in specified in § 4.3.3.2.1 and FIG. 4.3.3.2.1-1 of 3GPP TS 23.502 v15.2.0, which is incorporated herein by reference in its entirety.

In the illustrated embodiment, the user equipment initiates the PDU session modification procedure by transmitting an NAS message 905 to the AMF. However, in other embodiments, the SMF or a RAN initiate the PDU session modification procedure. The AMF sends a notification 910 of the request to the SMF. The PCF performs a PCF initiated policy association modification procedure to notify the SMS about the modification of policies, as indicated by the double-headed arrows 915.

If the SMF requested the modification, the UDM sends a message 920 to update subscription information that the SMF, which updates the subscription information and sends an acknowledgment 925 back to the UDM. The SMF also performs a QoS update four the PDU session at block 930.

The SMF may need to report some subscribed events to the PCF by performing an SMF initiated policy association modification procedure, as indicated by the double-headed arrows 935. However, this step may be skipped in some cases.

The SMF responds to the AMF by sending a context message 940. For an SMF requested modification, the SMF transmits a message 945 to the AMF to indicate, among other things, and allowed Access type. In some embodiments, the SMF invokes Namf_Communication_N1N2MessageTransfer (N2 SM information (PDU Session ID, QFI(s), QoS Profile(s), Session-AMBR), N1 SM container (PDU Session Modification Command (PDU Session ID, QoS rule(s), QoS Flow level QoS parameters if needed for the QoS Flow(s) associated with the QoS rule(s), QoS rule operation and QoS Flow level QoS parameters operation, Session-AMBR)), Allowed Access Type). In response to the message 840, the AMF transmits an acknowledgment message 945 to the SMF.

The AMF transmits a session request message 950 to the RAN, which performs access network specific resource modification including sending PDU session modification commands and acknowledgments, as indicated by the double-headed arrow 955. The remaining PDU session modification procedure is performed at block 960.

Figure 10:
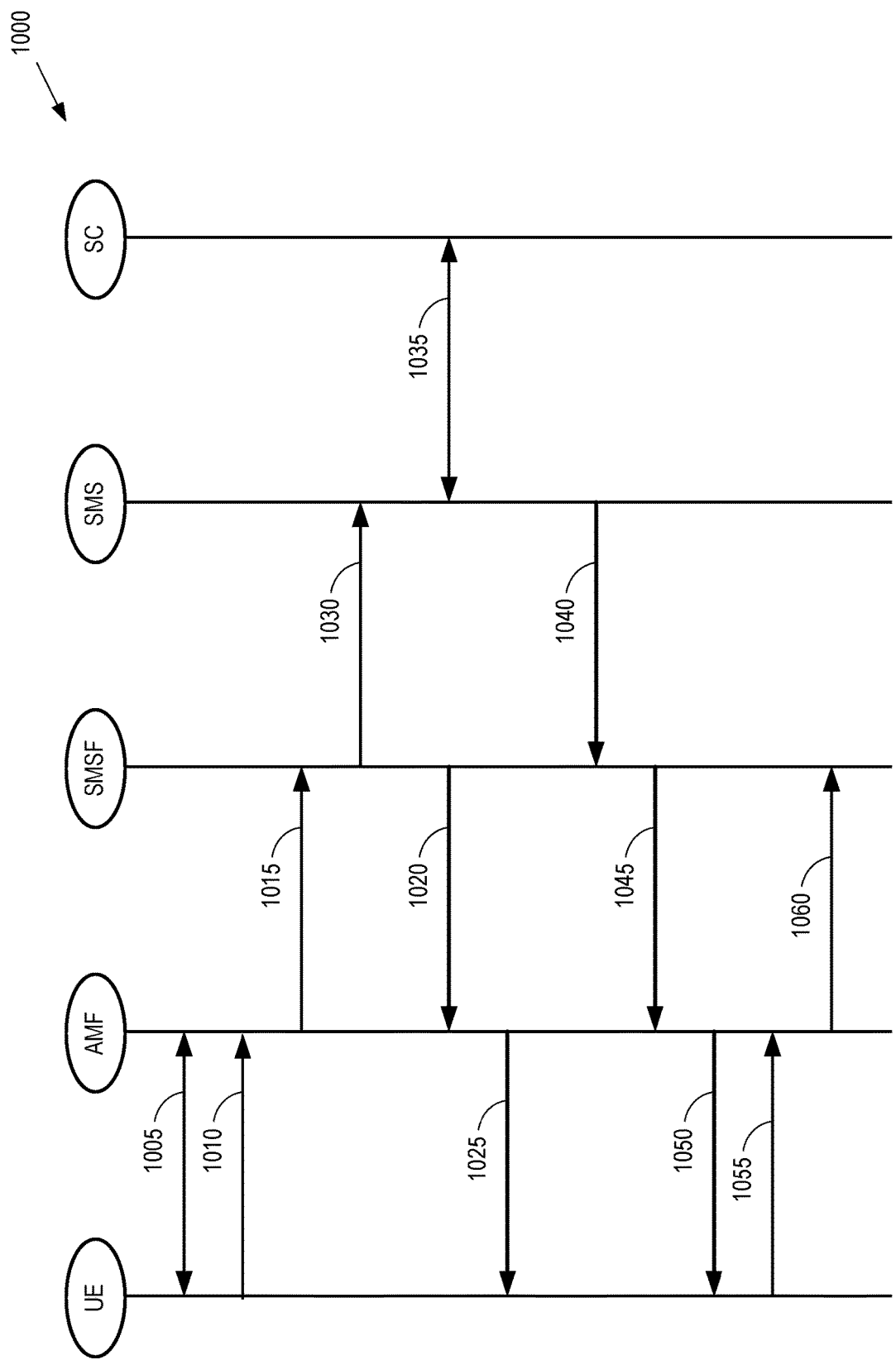
FIG. 10 is a message flow for mobile-originated short message service (SMS) signaling over NAS in connected management (CM)-idle mode according to some embodiments.

FIG. 10 is a message flow 1000 for mobile-originated short message service (SMS) signaling over NAS in CM-idle mode according to some embodiments. The message flow 1000 is implemented in some embodiments of the communication system 100 shown in FIG. 1. In the interest of clarity, some of the messages used for the SMS service are not illustrated in FIG. 10. A more detailed description including the omitted messages is found in specified in § 4.13.3.3 and FIG. 4.13.3.3-1 of 3GPP TS 23.502 v15.2.0, which is incorporated herein by reference in its entirety.

The user equipment performs domain selection for the SMS originated at the user equipment, as indicated by the double-headed arrows 1005. The user equipment and generates and sends an SMS message 1010 to the AMF. The SMS message 1010 is encapsulated in an NAS message with an indication indicating that the NAS messages for SMS transporting.

The AMF forwards (at step 1015) the SMS message to an SMSF that is serving the user equipment. The SMSF responds with an acknowledgment 1020 including information indicating the allowed Access types for the SMS message. In some embodiments, the SMSF invokes Namf_Communication_N1N2MessageTransfer service operation to forward SMS ack message to AMF. Allowed Access Type is set to "both," to indicate that the SMS message is transmittable using 3GPP access or non-3GPP access. The AMF forwards (at step 1025) the SMS acknowledgment message from the SMS to the user equipment using a downlink unit data message.

The SMSF performs a message exchange 1030, 1035, 1040 to check SMS management subscription data. The SMSF forwards a submit report 1045 to the AMF, which then forwards (at 1050) the submit report to the user equipment via downlink NAS transport. In response to determining that no more SMS messages are to be sent, the user equipment returns an acknowledgment 1055, which the AMF forwards (at step 1060) to the SMS.

Figure 11:
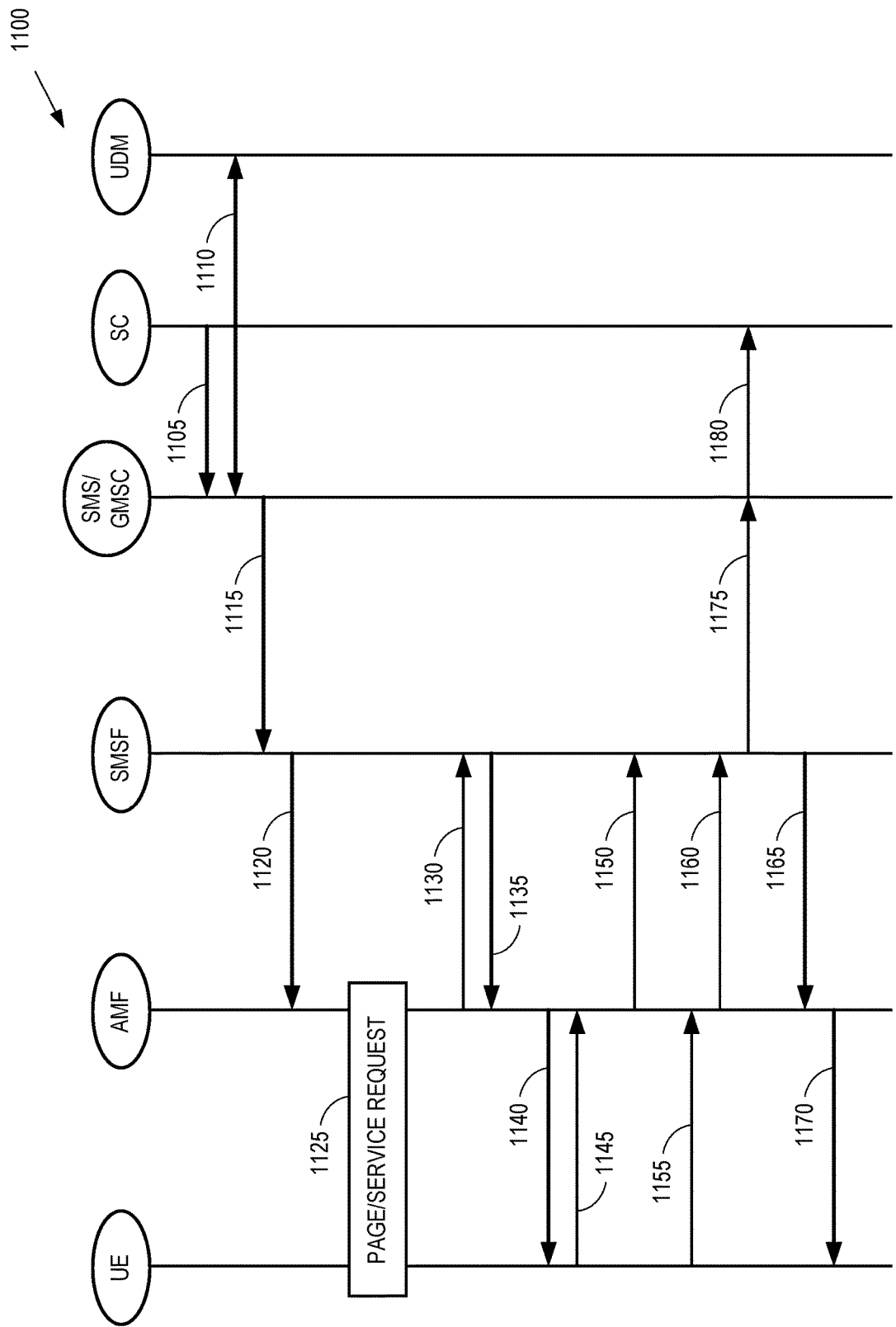
FIG. 11 is a message flow for mobile-terminated SMS signaling over NAS in CM-idle mode via 3GPP access according to some embodiments.

FIG. 11 is a message flow 1100 for mobile-terminated short message service (SMS) signaling over NAS in CM-idle mode via 3GPP access according to some embodiments. The message flow 1100 is implemented in some embodiments of the communication system 100 shown in FIG. 1. In the interest of clarity, some of the messages used for the SMS service are not illustrated in FIG. 11. A more detailed description including the omitted messages is found in specified in § 4.13.3.6 and FIG. 4.13.3.6-1 of 3GPP TS 23.502 v15.2.0, which is incorporated herein by reference in its entirety.

A service center (SC) transfers a message 1105 to an SMS gateway mobile services switching center (GMSC). Routing information for the message is negotiated between the SMS and the UDM, as indicated by the double-headed arrow 1110, and then the SMS-GMSC forwards the mobile terminated SMS message 1115 to the SMSF.

The SMSF checks the SMS management subscription data to determine whether SMS delivery is allowed using the message exchange 1120, 1125, 1130.

The SMSF sends the SMS message 1135 to the AMF, which forwards the SMS message body 1140 to the user equipment. In some embodiments, the SMSF forwards the SMS message to be sent as defined in TS 23.040, which is incorporated herein by reference in its entirety. The SMS message consists of CP-DATA/RP-DATA/TPDU/SMS-DELIVER parts, which is sent to AMF by invoking Namf_Communication_N1N2MessageTransfer service operation. The Allowed Access Type is set to "both," to indicate that the SMS message is transmittable using either a 3GPP access or non-3GPP access. The AMF transfers the SMS message to the user equipment.

The user equipment acknowledges receipt to the AMF and the SMSF by sending the acknowledgment messages 1145, 1150. The user equipment also returns a delivery report using the messages 1155, 1160. The delivery report is encapsulated in an NAS message and sent to the AMF, which forwards the message to the SMSF.

The SMS acknowledges receipt of the delivery report to the UE using the messages 1165, 1170. In some embodiments, the SMSF acknowledges receipt of the delivery report to the UE. The SMSF uses Namf_Communication_N1N2MessageTransfer service operation to send SMS CP ack message to the AMF. The AMF encapsulates the SMS message via a NAS message to the UE. If SMSF has more than one SMS to send, the SMSF and the AMF forwards subsequent SMS/SMS ack/delivery report the same way as described above. The Allowed Access Type is set to "both," to indicate allowable delivery via 3GPP access or non-3GPP access.

Concurrently with transmission of the messages 1165, 1170, the SMSF delivers the delivery report to the SC using the messages 1175, 1180.

In some embodiments, mobile terminated SMS in CM-CONNECTED procedure is specified by reusing the MT SMS in CM-IDLE state with the following modification:

There is no need for the AMF to perform Paging of the UE and can immediate continue with a message to SMSF via N20 to allow the SMSF to start forward the MT SMS.

If the delivery of the NAS PDU containing the SMS fails e.g. in case the UE is in RRC Inactive and NG-RAN paging was not successful, the NG-RAN initiate the UE context release in the AN procedure and provide notification of non-delivery to the AMF. The AMF provides an indication of non-delivery to the SMSF.

In some embodiments, mobile terminated SMS procedure via non-3GPP access is specified by reusing the MT SMS via 3GPP access in CM-CONNECTED state with the following modification:

If the UE access to the network via both 3GPP and non-3GPP accesses and the AMF determines to deliver MT-SMS via non-3GPP access based on operator policy in step 4, the NAS messages is transferred via non-3GPP access network.

Figure 12:
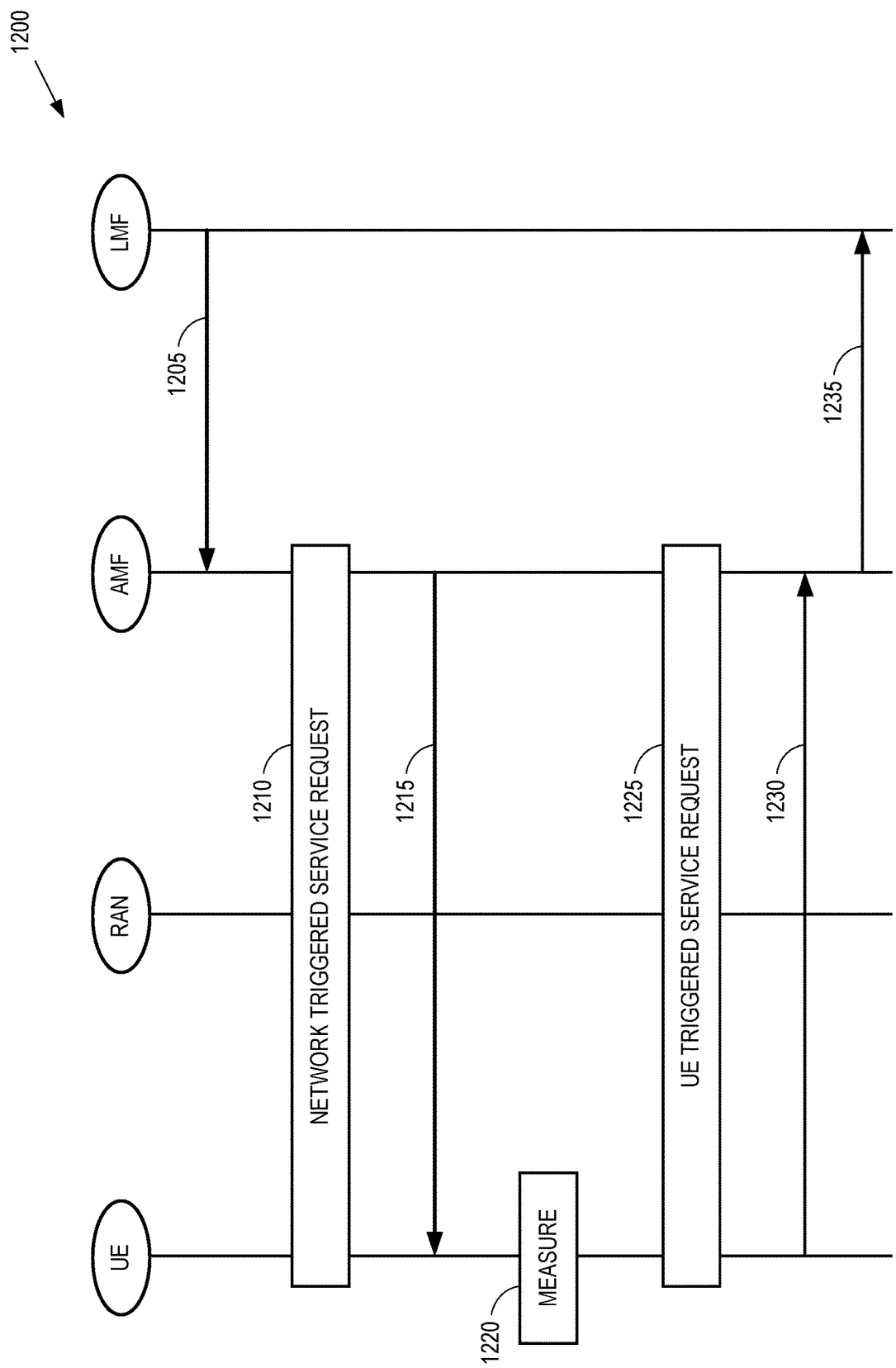
FIG. 12 is a message flow for the user equipment assisted and user equipment-based positioning procedure according to some embodiments.

FIG. 12 is a message flow 1200 for the user equipment assisted and user equipment-based positioning procedure according to some embodiments. The message flow 1200 is implemented in some embodiments of the communication system 100 shown in FIG. 1. In the interest of clarity, some of the messages used for the positioning procedure are not illustrated in FIG. 12. A more detailed description including the omitted messages is found in specified in § 4.13.5.4 and FIG. 4.13.5.4-1 of 3GPP TS 23.502 v15.2.0, which is incorporated herein by reference in its entirety.

An LMF invokes a positioning service operation by transmitting a message 1205 to the AMF. In some embodiments, the LMF invokes the Namf_Communication_N1N2MessageTransfer service operation towards the AMF to request the transfer of a Downlink (DL) Positioning message to the user equipment. The service operation includes the DL Positioning message. The Session ID parameter of the Namf_Communication_N1N2MessageTransfer service operation is set to the LCS Correlation identifier. The Downlink Positioning message may request location information from the UE, provide assistance data to the UE or query for the UE capabilities. The Allowed Access Type is set to "3GPP," to indicate that the positioning services only provided via 3GPP access and is not provided via non-3GPP access.

If the user equipment is in a CM-idle state, the AMF initiates a network triggered service request procedure 1210. The AMF forwards a downlink positioning message 1215 to the user equipment. The user equipment stores (at block 1220) any assistance data provided in the downlink positioning message. The user equipment also performs any positioning measurements and location computations requested in the downlink positioning message 1205. If the user equipment entered the CM-idle state in block 1220, the user equipment instigates a user equipment triggered service request at block 1225.

The user equipment returns location information obtained at block 1220 by transmitting a message 1230 to the AMF. The AMF then invokes a notification service operation 1235 towards the LMF.

Figure 13:
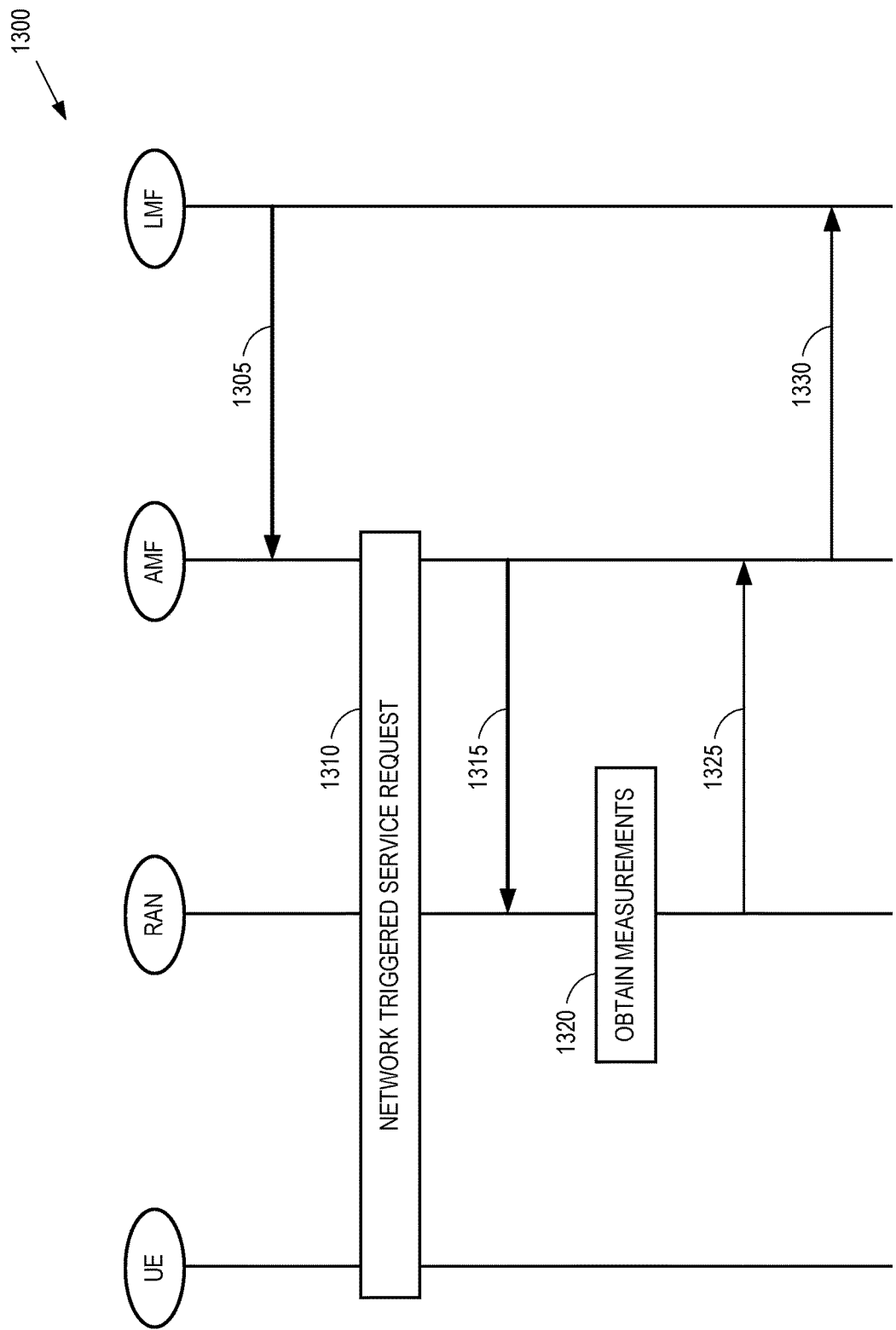
FIG. 13 is a message flow for a network assisted positioning procedure according to some embodiments.

FIG. 13 is a message flow 1300 for a network assisted positioning procedure according to some embodiments. The message flow 1300 is implemented in some embodiments of the communication system 100 shown in FIG. 1. In the interest of clarity, some of the messages used for the network assisted positioning procedure are not illustrated in FIG. 13. A more detailed description including the omitted messages is found in specified in § 4.13.5.5 and FIG. 4.13.5.5-1 of 3GPP TS 23.502 v15.2.0, which is incorporated herein by reference in its entirety.

The LMF transmits a network positioning message 1305 to the AMF. In some embodiments, the LMF invokes the Namf_Communication_N1N2MessageTransfer service operation towards the AMF to request the transfer of a Network Positioning message to the serving NG-RAN node (gNB or ng-eNB) for the UE. The service operation includes the Network Positioning message and the LCS Correlation identifier. The Network Positioning message may request location information for the UE from the NG-RAN. The Allowed Access Type is set to "3GPP," to indicate that the positioning services only provided via 3GPP access and is not provided via non-3GPP access.

If the user equipment is in a CM-idle state, the AMF initiates a network triggered service request procedure 1310. The AMF forwards a network positioning message 1315 to a serving RAN node, which obtains location information, e.g., by performing measurements, at the block 1320. In the obtains location information is transmitted from the RAN to the AMF in a transport message 1325. The AMF then forwards the location information to the LMF using a service notification 1330.

FIG. 14 is a message flow 1400 for obtaining network assistance data according to some embodiments. The message flow 1400 is implemented in some embodiments of the communication system 100 shown in FIG. 1. In the interest of clarity, some of the messages used for the network assistance procedure are not illustrated in FIG. 14. A more detailed description including the omitted messages is found in specified in § 4.13.5.6 and FIG. 4.13.5.6-1 of 3GPP TS 23.502 v15.2.0, which is incorporated herein by reference in its entirety.

The LMF initiates a transfer service operation by sending a network positioning message 1405 to the AMF. In some embodiments, the LMF invokes the Namf_Communication_N1N2MessageTransfer service operation towards the AMF to request the transfer of a Network Positioning message to a NG-RAN node (gNB or ng-eNB) in the NG-RAN. The service operation includes the Network Positioning message and the target NG-RAN node identity. The Network Positioning message may request position related information from the NG-RAN. The Allowed Access Type is set to "3GPP," to indicate that network positioning is performed only via 3GPP access and is not performed using non-3GPP access.

The AMF forwards (at step 1410) the network positioning message to a target RAN node indicated in the message 1405 received from the LMF. The target RAN mode obtains any requested position related information, e.g., by performing measurements at block 1415. The target ran node returns any position related information to the AMF in a network positioning message included in a transport message 1420. The AMF forwards information from the message 1420 to the LMF in a notification 1425.

In some embodiments, a message transfer service operation is defined according to the following parameters:
Service operation name: Namf_Communication_N1N2MessageTransfer.
Description: CN NF request to transfer downlink N1 and/or N2 message to the UE and/or AN through the AMF.
Input, Required: CN NF ID, Message type (N1 or N2 or both), Message Container (s) where at least one of the message containers (N1 or N2) is required, Allowed Access Type (3GPP, non-3GPP or both).
Input, Optional: last message indication, Session ID, Paging Policy Indication, ARP, Area of validity for the N2 SM information, 5QI, N1N2TransferFailure Notification Target Address.
Output, Required: Result indication.
Output, Optional: Redirection information.

If the UE is in CM-IDLE state, the AMF initiates the network triggered service request procedure as specified in clause 4.2.3.4 of TS 23.502 and responds to the consumer NF with a result indication, "attempting to reach UE". Otherwise, the AMF responds to the consumer NF, with a Namf_Communication_N1N2MessageTransfer response, providing a result indication of whether the AMF was able to successfully transfer the N1 and/or the N2 message towards the UE and/or the AN. A result indication of "N1/N2 transfer success" does not mean that N1 message is successfully received by the UE. It only means that the AMF is able to successfully send the N1 or N2 message towards the AN.

The "Allowed Access Type" indicates which access type can be used to send the N1 or N2 message towards the AN. If the Allowed Access Type is set to either 3GPP or non-3GPP, the indicated access type shall be used. If the Allowed Access Type is set to "both", the AN shall send the N1 or N2 message via 3GPP if the UE is registered to 3GPP access first and non-3GPP access as fallback or, if the UE is not registered to 3GPP access, the AN shall send the N1 or N2 message via non-3GPP (if in CM-CONNECTED state).

The "Area of validity for the N2 SM information", if included is used by the AMF to determine whether the N2 SM information provided by the consumer NF can be used towards the AN based on the current location of the UE. If the location of the UE is outside the "Area of validity for the N2 SM information" indicated, the AMF shall not send the N2 SM information to the AN.

In case the consumer NF knows that a specific downlink N1 message is the last message to be transferred in this transaction, the consumer NF shall include the last message indication in the Namf_Communication_N1N2MessageTransfer service operation so that the AMF knows that the no more downlink N1 message need to be transferred for this transaction.

The CN NF is implicitly subscribed to be notified of N1N2TransferFailure by providing the N1N2TransferFailure Notification Target Address. When AMF detects that the UE fails to response to paging, the AMF invokes the Namf_Communication_N1N2TransferFailureNotification to provide the failure notification to the location addressed by N1N2TransferFailure Notification Target Address.

If the result of the service operation fails, the AMF shall set the corresponding cause value in the result indication which can be used by the NF consumer for further action. In case the related UE is not served by AMF and the AMF knows which AMF is serving the UE, the AMF provides redirection information which can be used by the consumer NF to resend UE related message to the AMF that serves the UE.

As discussed herein, when the user equipment is involved in a handover between non-3GPP and 3GPP accesses, the user equipment initiates PDU session establishment. In this case, the SMF requests PCF to update the PDU session related policies all along the path. This is described in step 9 of FIG. 4.2.3.2-1 of TS 23.502, which states: "the SMF may perform an SMF initiated SM Policy Association Modification procedure to provide information on the Policy Control Request Trigger condition(s) that have been met."

However, in the case of a Service Request initiated by a user equipment (due to paging), in which the list of "PDU sessions allowed to be moved to 3GPP access" is included, the Core Network may decide to move one or several PDU sessions from non-3GPP to 3GPP access. In that case, the other SMF should ask PCF about whether new PDU session related policies should apply. But this is not described in the specifications.

If the AMF has received a N1 SM Container and N2 SM Information from the SMF and the PDU Session ID is associated to an access over which the user equipment cannot be reached, the AMF shall notify/page the UE via the "other access". The user equipment replies with Service Request and, if the PDU session is in the returned list of allowed PDU sessions, the AMF should indicate that the access type has changed in the notification to SMF and discard the N1 SM Container and the N2 SM Information. The SMF is then able to request PCF about the PCC rules in the other access and build a new N1 SM Container, adapted to the new access. This solution works but it increases the signaling between SMF and AMF: if the SMF is aware that the N1 SM Container and the N2 SM Information are valid in any access, then it could tell it to the AMF. This could be done by the SMF indicating the access allowed to be used for sending the signaling (3GPP, non-3GPP, both).

Moreover, the SMSF and the LMF use the same service operation as the SMF i.e. Namf_Communication_N1N2MessageTransfer. It should be possible for the SMSF or the LMF to specify whether the N1 message should be sent via 3GPP access, non-3GPP access or any of them. Indeed, there is a need to have different behaviors depending on the use case. For example, the SMS could be sent over any access (attempting over 3GPP access and if no answer attempting over non-3GPP access). However, a Downlink Positioning message from LMF (see clause 4.13.5.4 of TS23.502) should be dedicated to the 3GPP access only. How could the AMF know whether to send the N1 SM message over 3GPP access, non-3GPP access or both?

The AMF should not decide different behaviors depending on the source (SMF, SMSF, LMF, etc.). If a new NF wants to use the Namf_Communication_N1N2MessageTransfer service operation, the AMF should know whether the service applies for a particular access or not.

Some embodiments of the techniques disclosed herein are applied to the case in which a PDU session is moved from non-3GPP access to 3GPP access using a user equipment triggered Service request. The Namf_Communication_N1N2MessageTransfer service operation is enhanced with a new input "Allowed Access Type" stating whether the service applies for 3GPP access, non-3GPP access or both (always trying 3GPP access first). It is clarified that the N1 SM Container shall be sent using the Downlink NAS Transport (and not the Service Accept), as described in 3GPP TS 24.501, which is incorporated herein by reference in its entirety, (see clauses 8.2.17 and 8.2.11) and in TS 23.502 clause 4.13.3 for SMS, clause 4.13.5 for Location Services.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
   (a) hardware-only circuit implementations (such as implementations and only analog and/or digital circuitry) and
   (b) combinations of hardware circuits and software, such as (as applicable):
      (i) a combination of analog and/or digital hardware circuit(s) with software/firmware and
      (ii) any portions of a hardware processor(s) with software (including digital signal processor(s), software, and memory(ies) that work together to cause an apparatus, such as a mobile phone or server, to perform various functions) and
   (c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
receiving, at a service responsible for sending signaling to a user equipment or an access network serving the user equipment, a request to send the signaling to the user equipment or to the access network together with access type control information indicating whether the signaling is transmittable using any of a plurality of access types or a specific access type provided in the request; and
selectively forwarding from the service the signaling to the user equipment or the access network based on the access type control information,
wherein the selectively forwarding comprises:
rejecting by the service the request when it is not possible to send the signaling via the specific access type provided in the request;
wherein the service detects that it is not possible to send the signaling via the specific access type provided in the request when the service detects at least one of following:
the user equipment is not in a connected state via the specific access type and either the user equipment cannot be paged via the specific access type or the user equipment does not answer to paging over the specific access type, or
the user equipment is in the connected state via the specific access type and the access network indicates a failure of access network paging.

2. The method of claim 1, wherein the service is supported by an access and mobility management function.

3. The method of claim 1, wherein the signaling to be sent comprises at least one of non-access stratum signaling to be sent to the user equipment or N2 signaling to be sent to the access network.

4. The method of claim 3, wherein, in case the access type control information provided in the request indicates that the signaling is transmittable using any of the plurality of access types, the service tries to send the signaling via a further one of the plurality of access types when it is not possible to send the signaling via a previous one of the plurality of access types.

5. The method of claim 4, wherein, in case the access type control information provided in the request indicates that the signaling is transmittable using any of the plurality of access types, the request provides an order between the access types for the service to try sending the signaling.

6. An apparatus comprising:
at least one processor; and
at least one non-transitory memory including computer program code;
the at least one memory and the computer program code configured to, with the at least one processor, cause the apparatus at least to perform:
receiving, at a service responsible for sending signaling to a user equipment or an access network serving the user equipment, a request to send the signaling to the user equipment or to the access network together with access type control information indicating whether the signaling is transmittable using any of a plurality of access types or a specific access type provided in the request; and
selectively forwarding from the service the signaling to the user equipment or the access network based on the access type control information,
wherein the selectively forwarding comprises:
rejecting by the service the request when it is not possible to send the signaling via the specific access type provided in the request;
wherein the service detects that it is not possible to send the signaling via the specific access type provided in the request when the service detects at least one of following:
the user equipment is not in a connected state via the specific access type and either the user equipment cannot be paged via the specific access type or the user equipment does not answer to paging over the specific access type, or
the user equipment is in the connected state via the specific access type and the access network indicates a failure of access network paging.

7. The apparatus of claim 6, wherein the service is supported by an access and mobility management function.

8. The apparatus of claim 6, wherein the signaling to be sent comprises at least one of non-access stratum signaling to be sent to the user equipment or N2 signaling to be sent to the access network.

9. The apparatus of claim 8, wherein, in case the access type control information provided in the request indicates that the signaling is transmittable using any of the plurality of access types, the service tries to send the signaling via a further one of the plurality of access types when it is not possible to send the signaling via a previous one of the plurality of access types.

10. The apparatus of claim 9, wherein, in case the access type control information provided in the request indicates that the signaling is transmittable using any of the plurality of access types, the request provides an order between the access types for the service to try sending the signaling.

* * * * *